Figure 4:
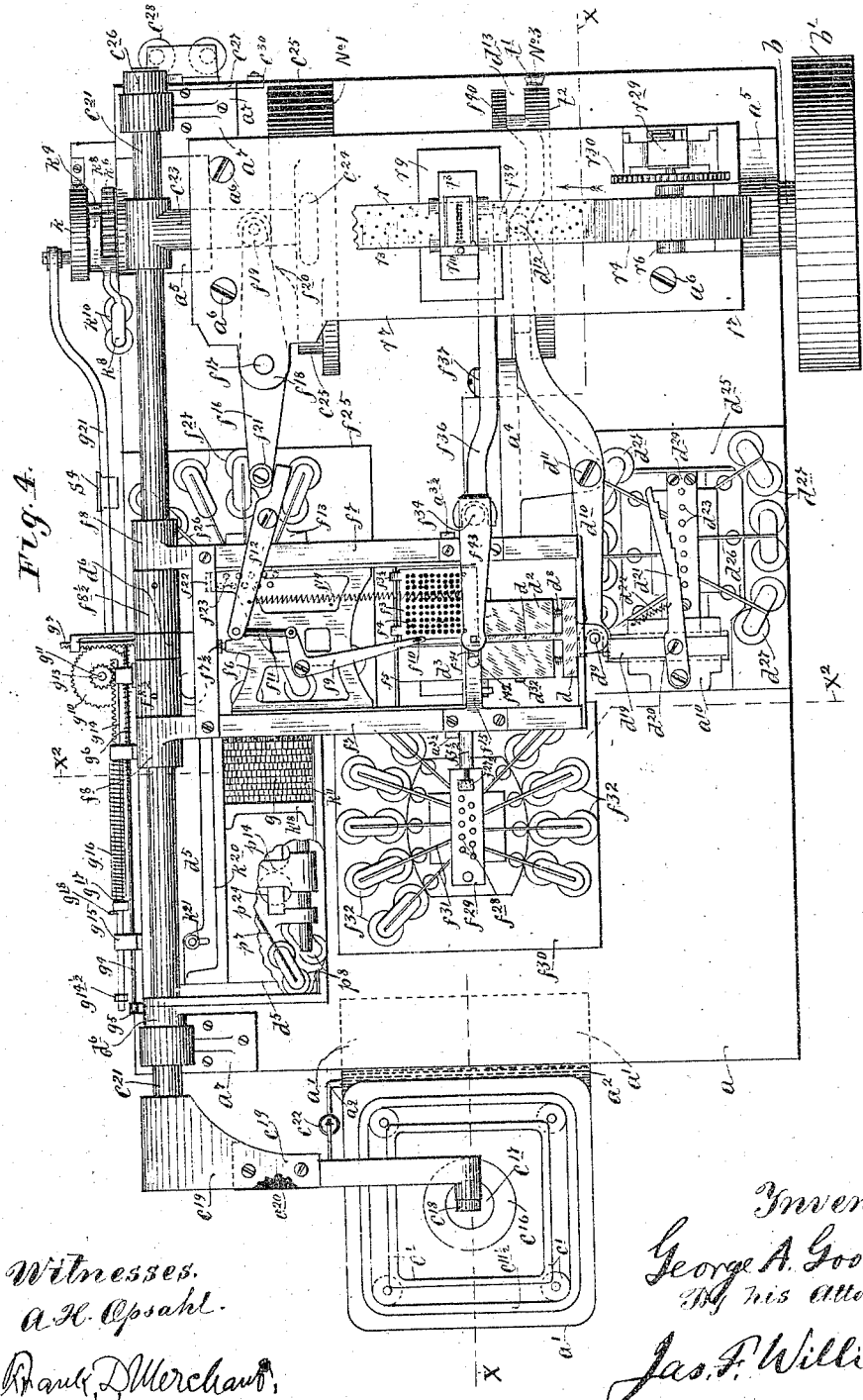

(No Model.) 15 Sheets—Sheet 1.
G. A. GOODSON.
TYPE CASTING AND SETTING MACHINE.
No. 530,481. Patented Dec. 4, 1894.
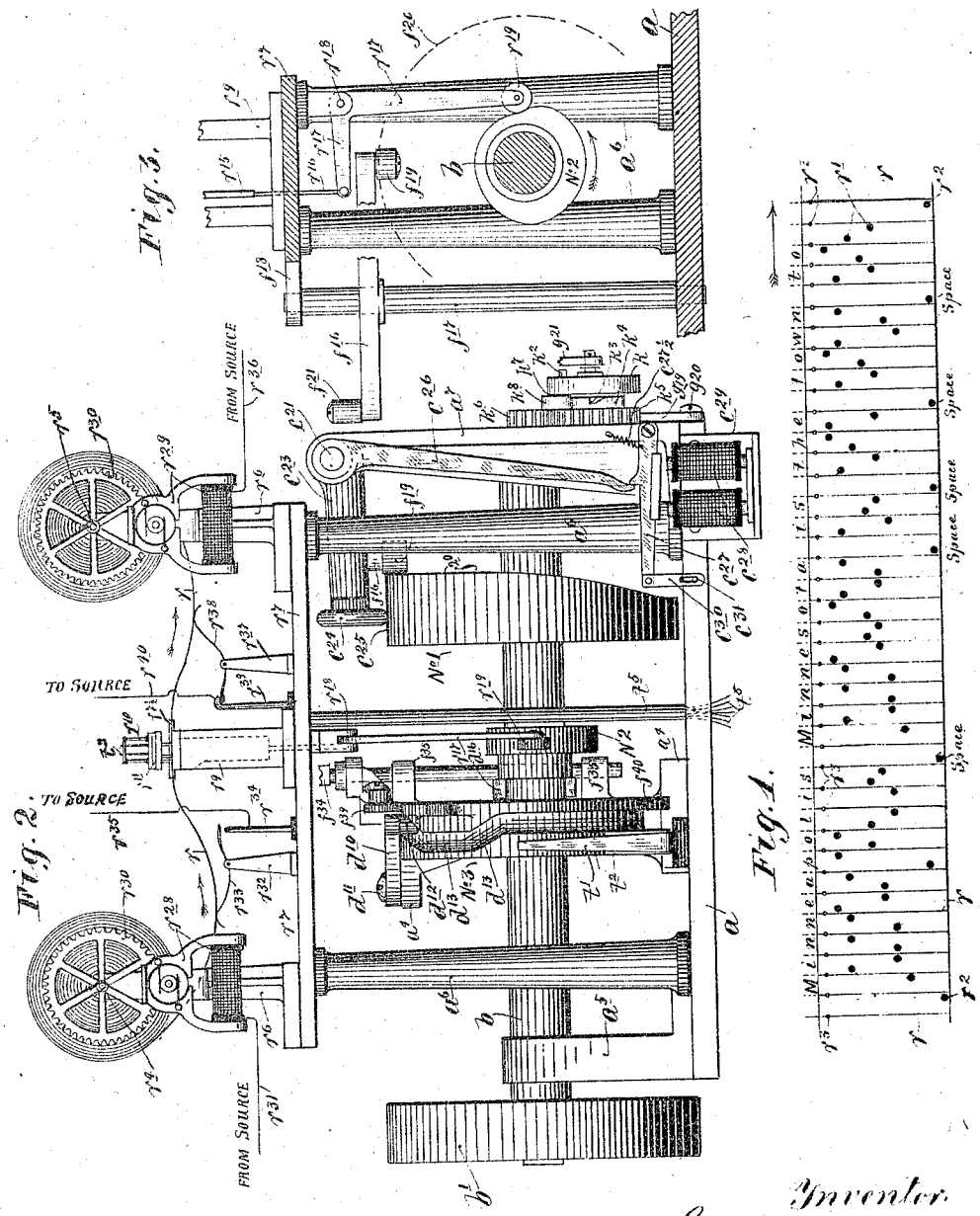
Witnesses
A. H. Opsahl.
Frank D. Merchant
Inventor
George A. Goodson
By his Attorney
Jas. F. Williamson (No Model.) 15 Sheets—Sheet 2.

G. A. GOODSON.
TYPE CASTING AND SETTING MACHINE.

No. 530,481. Patented Dec. 4, 1894.

Witnesses.
A. H. Opsahl.
Frank D. Merchant.

Inventor.
George A. Goodson
By his Attorney.
Jas. F. Williamson (No Model.) 15 Sheets—Sheet 3.

G. A. GOODSON.
TYPE CASTING AND SETTING MACHINE.

No. 530,481. Patented Dec. 4, 1894.

Witnesses.
A. H. Opsahl.
Bank D. Merchant.

Inventor
George A. Goodson
By his Attorney
Jas. P. Williamson

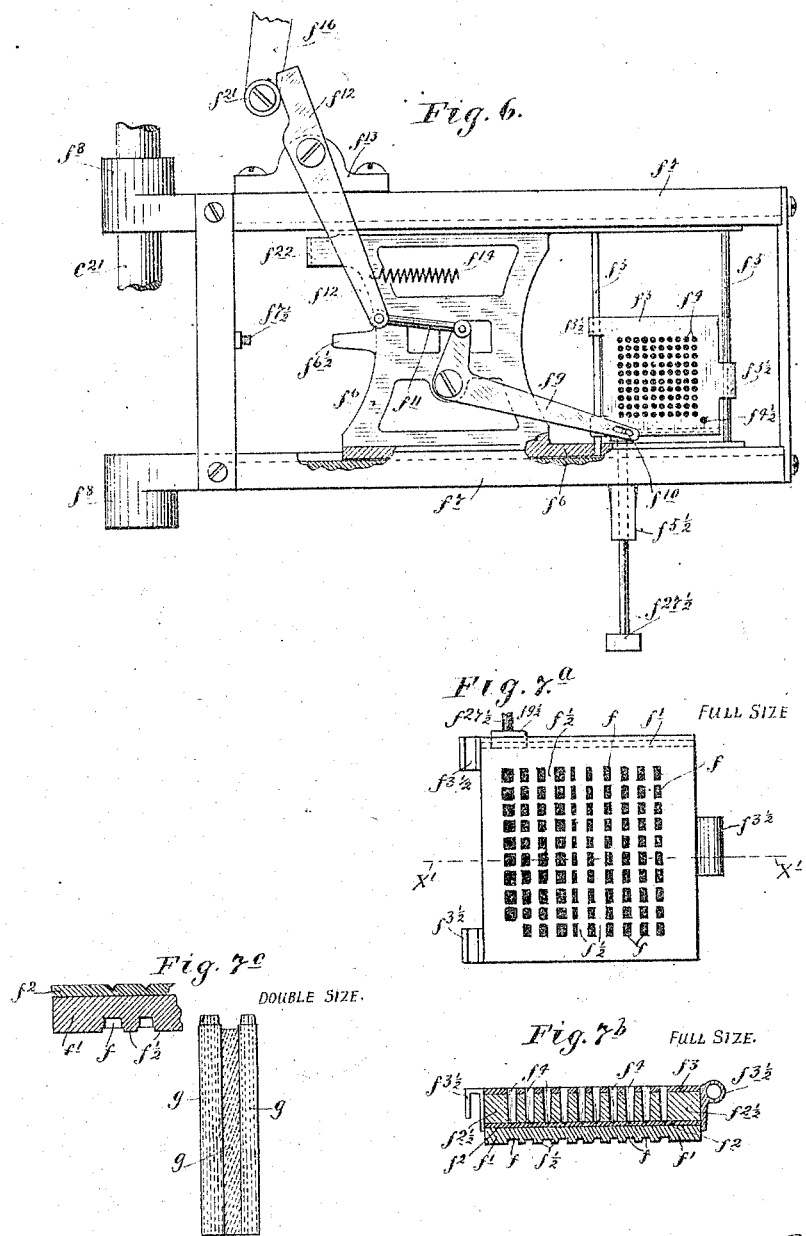

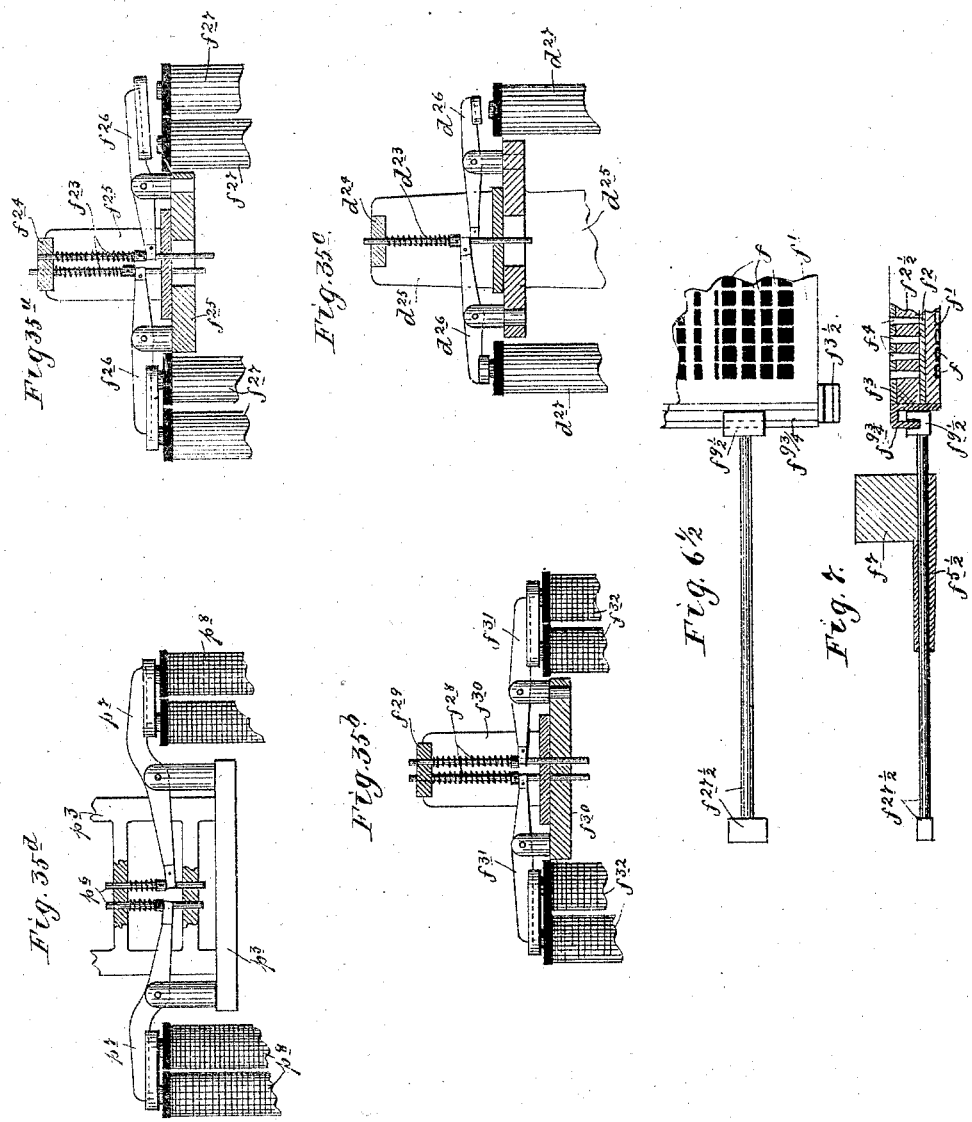

(No Model.) 15 Sheets—Sheet 6.
G. A. GOODSON.
TYPE CASTING AND SETTING MACHINE.
No. 530,481. Patented Dec. 4, 1894.
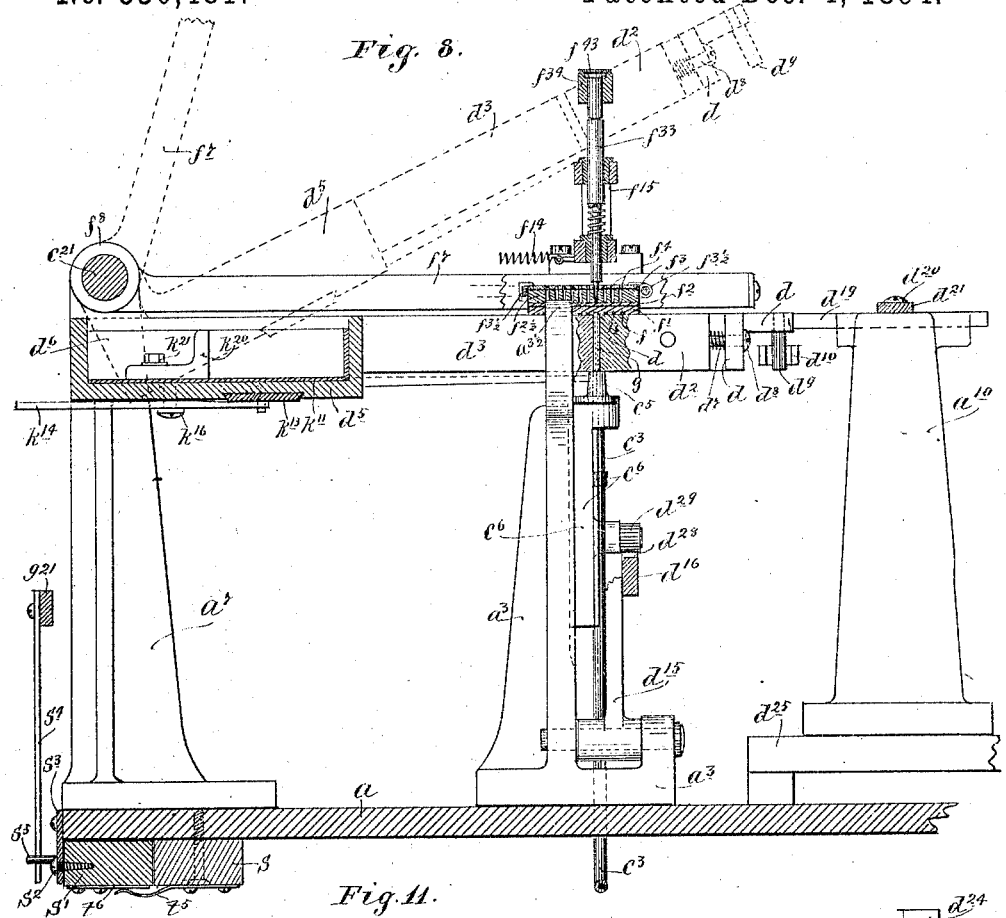
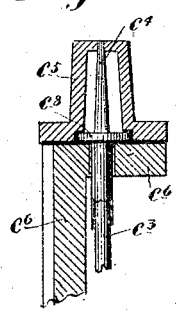
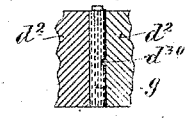
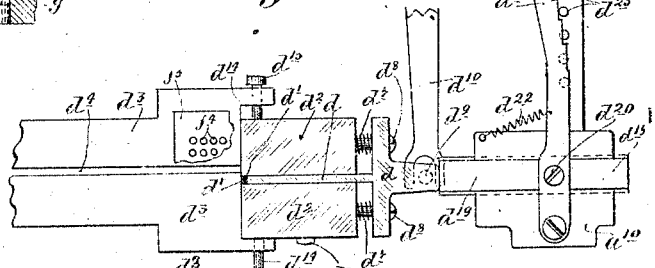
Witnesses.
A. H. Opsahl.
Frank D. Merchant.
Inventor.
George A. Goodson
By his Attorney.
Jas. F. Williamson (No Model.) 15 Sheets—Sheet 7.
G. A. GOODSON.
TYPE CASTING AND SETTING MACHINE.
No. 530,481. Patented Dec. 4, 1894.
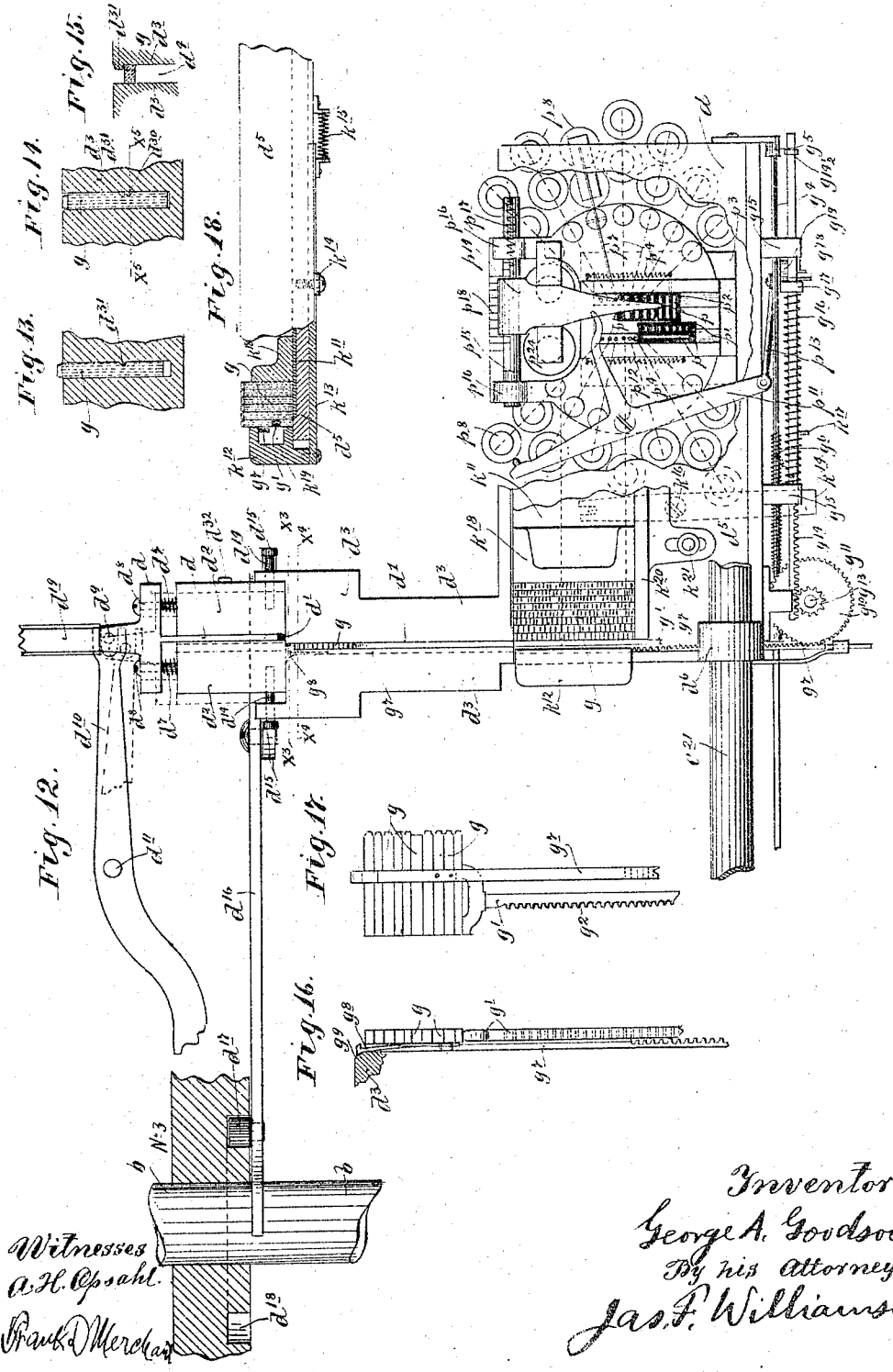
Witnesses
A. H. Opsahl.
Frank D. Merchant
Inventor.
George A. Goodson
By his Attorney
Jas. F. Williamson (No Model.) 15 Sheets—Sheet 8.
G. A. GOODSON.
TYPE CASTING AND SETTING MACHINE.
No. 530,481. Patented Dec. 4, 1894.
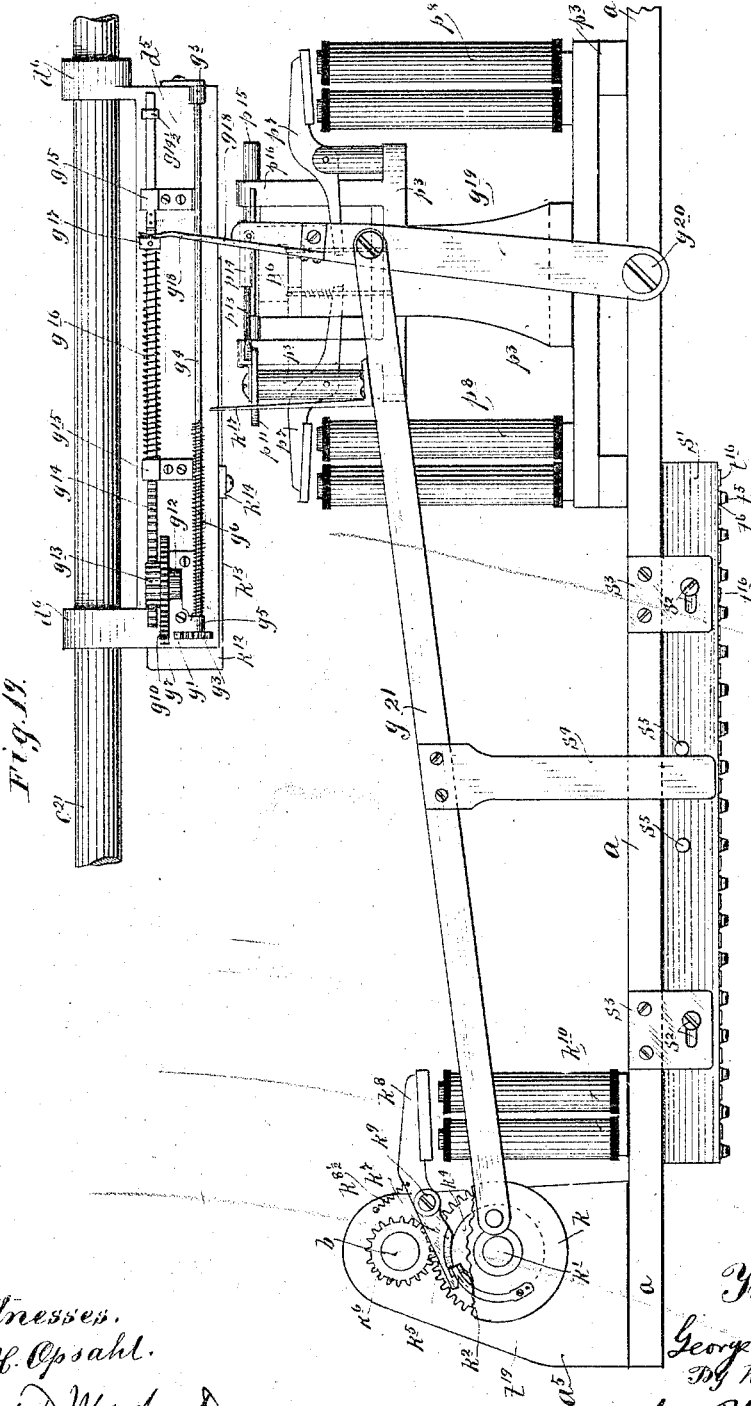
Witnesses.
A. H. Opsahl.
Frank D. Merchant.
Inventor.
George A. Goodson
By his Attorney
Jas. P. Williamson (No Model.)  
15 Sheets—Sheet 9.

G. A. GOODSON.  
TYPE CASTING AND SETTING MACHINE.

No. 530,481.  
Patented Dec. 4, 1894.

Witnesses.  
A. H. Opsahl.  
Frank D. Merchant.

Inventor.  
George A. Goodson  
By his Attorney.  
Jas. F. Williamson (No Model.)  
15 Sheets—Sheet 10.

G. A. GOODSON.
TYPE CASTING AND SETTING MACHINE.

No. 530,481. Patented Dec. 4, 1894.

Witnesses.  
A. H. Opsahl.  
Frank D. Merchant.

Inventor  
George A. Goodson  
By his Attorney  
Jas. F. Williamson (No Model.)

15 Sheets—Sheet 11.

G. A. GOODSON.
TYPE CASTING AND SETTING MACHINE.

No. 530,481. Patented Dec. 4, 1894.

Witnesses
A. H. Opsahl.
Frank D. Merchant.

Inventor.
George A. Goodson
By his Attorney
Jas. P. Williamson.

(No Model.)

15 Sheets—Sheet 12.

G. A. GOODSON.
TYPE CASTING AND SETTING MACHINE.

No. 530,481.

Patented Dec. 4, 1894.

Witnesses.
A. H. Opsahl
Frank D. Merchant.

Inventor.
George A. Goodson
By his Attorney
Jas. F. Williamson (No Model.) 15 Sheets—Sheet 13.
G. A. GOODSON.
TYPE CASTING AND SETTING MACHINE.

No. 530,481. Patented Dec. 4, 1894.

Witnesses.
A. H. Opsahl
Frank D. Merchant

Inventor.
George A. Goodson
By his Attorney.
Jas. F. Williamson (No Model.) 15 Sheets—Sheet 14.
G. A. GOODSON.
TYPE CASTING AND SETTING MACHINE.
No. 530,481. Patented Dec. 4, 1894.
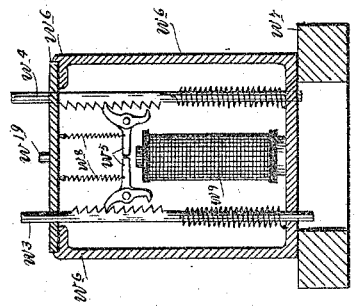
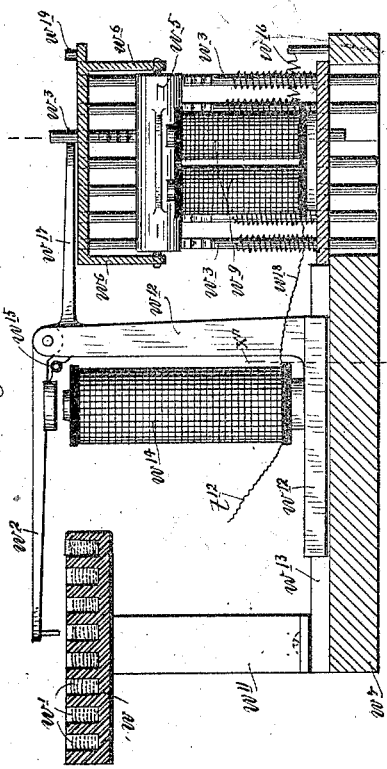
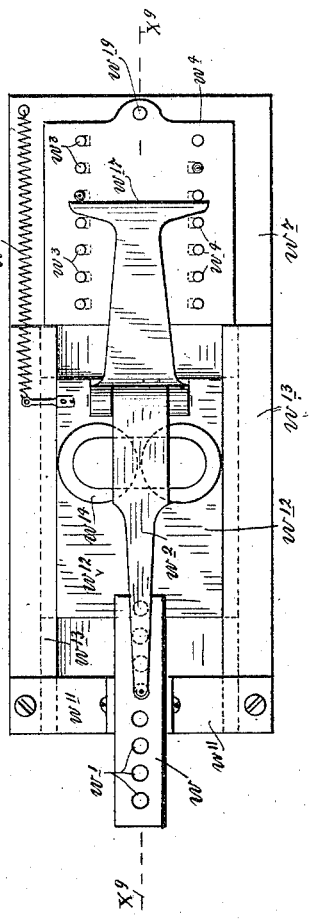
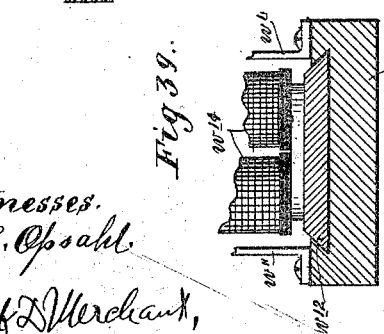
Witnesses.
A. H. Opsahl.
Frank D. Merchant.
Inventor.
George A. Goodson
By his Attorney.
Jas. F. Williamson (No Model.)
15 Sheets—Sheet 15.
G. A. GOODSON.
TYPE CASTING AND SETTING MACHINE.
No. 530,481. Patented Dec. 4, 1894.
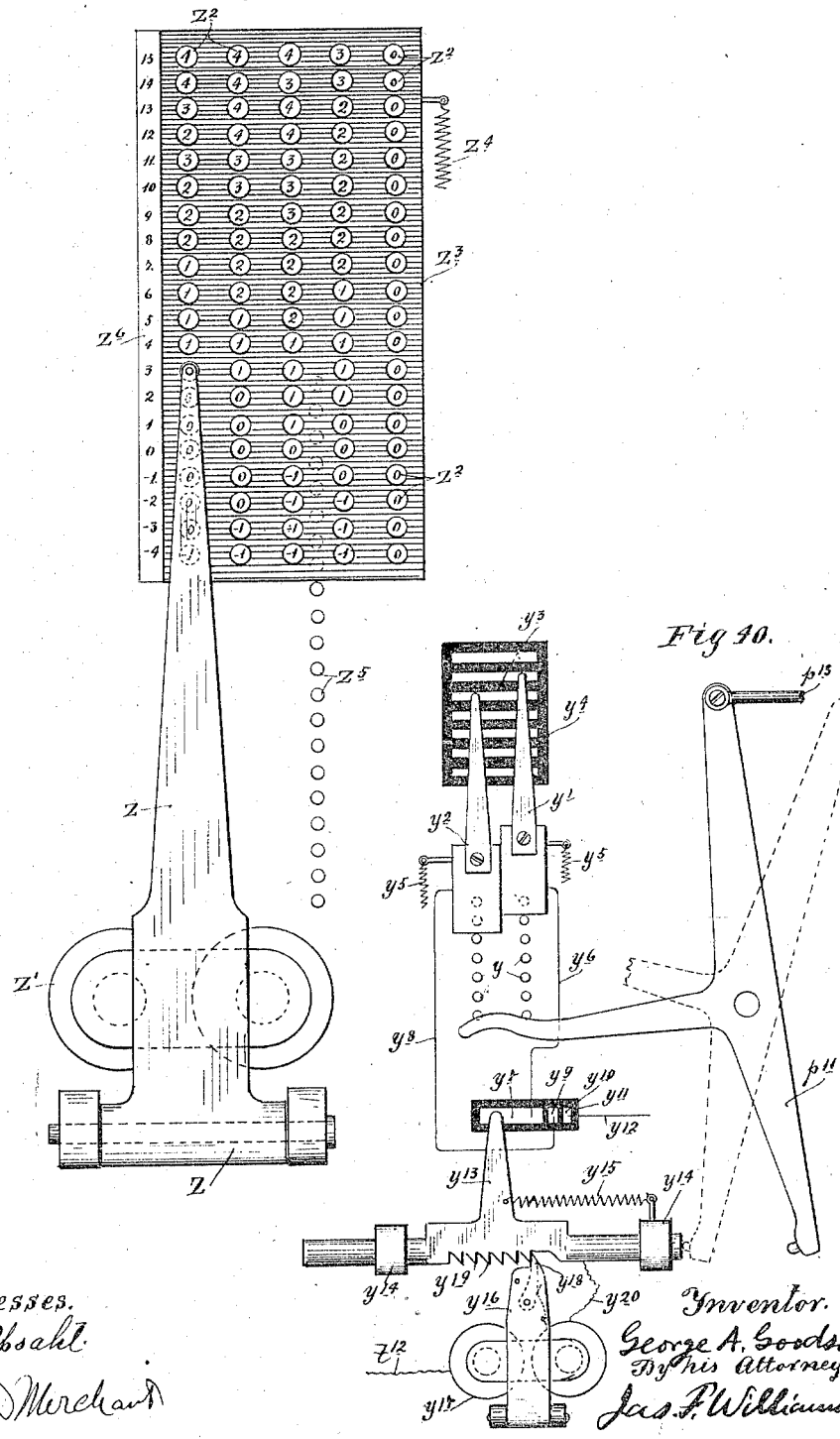
Witnesses.
A. H. Opsahl.
Frank D. Merchant
Inventor.
George A. Goodson,
By his Attorney.
Jas. F. Williamson

UNITED STATES PATENT OFFICE.

GEORGE A. GOODSON, OF MINNEAPOLIS, MINNESOTA, ASSIGNOR TO THE GOODSON TYPE CASTING AND SETTING MACHINE COMPANY, OF SAME PLACE.

TYPE CASTING AND SETTING MACHINE.

SPECIFICATION forming part of Letters Patent No. 530,481, dated December 4, 1894.

Application filed December 8, 1893. Serial No. 493,116. (No model.)

*To all whom it may concern:*

Be it known that I, GEORGE A. GOODSON, a citizen of the Dominion of Canada, residing at Minneapolis, in the county of Hennepin and State of Minnesota, have invented certain new and useful Improvements in Type Casting and Setting Machines; and I do hereby declare the following to be a full, clear, and exact description of the invention, such as will enable others skilled in the art to which it appertains to make and use the same.

My invention relates to combined type-casting and type-setting machines; and has for its object to provide an efficient machine of this class.

To this end, my invention consists of certain novel devices and combinations of devices; which will be hereinafter fully described and be defined in the claims.

As the result of a large experience and observation, in the field of the printing art, I have become convinced that what the trade demands is not a substitute for individual type, but a practical and efficient machine, of reasonably low cost, which will produce and set up individual type in justified lines. This demand is due to the great advantages possessed by individual type, for the purposes of correction, substitution, shifting of matter, &c.; and printers are very reluctant to accept substitutes, whether in the form of linotypes or stereotype plates cast from machine made matrices.

Under my system, type may be produced equal, in every way, so far as printing surface is concerned, to the ordinary printer's type, and be delivered set up in lines, with perfect justification, and in a galley or form for handling exactly as hand-set type. The printer is therefore free to exercise all the acquired skill of his craft, in handling the matter; and in addition, the great advantage, for newspaper work, is afforded over hand-set type of "a new dress every day;" and, of course, no distribution is required.

To accomplish the foregoing result, under my system, I employ two companion machines; one of which is the machine herein described; and the other of which I call the composing machine. This composing machine involves the co-operation of a differential register type-writing machine and a puncturing mechanism, the conjoint result of which is a representative controlling strip, for use on the casting and setting machine, and, a type-written proof of the composition. This composing machine is fully described in a companion application, filed by me of even date herewith. The representative controlling strip turned out by the said composing machine, contains perforations representing every element of the composition or line of matter indicated on the type-writing machine or key-board, together with certain additional perforations, for co-operation on the casting and setting machine, to deliver the last made line of type, and to set a justifier, for controlling the variable mold, under the action of said strip at the word spaces, so as to justify the next line. The differential register employed on the type-writing machine is graduated on the unit principle of type face, which range in running width from one to seven units. On these composing machines, as I have demonstrated by experience absolute type-writer's speed is obtainable.

Turning now to the principles of the machine herein described, it will be readily understood from what has already been said, that the type-body mold and the type face matrices employed, are adapted to produce self spacing type. In other words, the construction involves the unit principle of type-face, and the point principle of type body. The type cast from my machine, are, therefore, interchangeable with ordinary self-spacing type. This is an advantage which will be appreciated by all printers. The variation in spacing, for purposes of justification, is applied to certain of the word spaces, by the casting of quads varying from the normal, in running width of face, in multiples of the common unit, either by way of addition or substraction, as may be best adapted for the given line of composition. Otherwise stated, my justification is exactly the same in principle as the justification employed in hand-set type.

Several of the salient features of the mechanism, employed in the machine herein described, may be briefly noted as follows: First, an integral font matrix block, which is constructed on a novel principle, first, with a view to perfection of matrix and type-face and precision in the location of the matrix on the block and the type-face on the type-body, and, second, with a view to compactness and lightness of the matrix-block, for facility of movement; and which block also has the matrices arranged, on a bi-factored principle, into rows in two directions, for selection by a two-way movement of the block, and grouped according to running width of matrix or type-face, for convenience in control from a common source with the variable type-body mold; second, the variable type-body mold, the throat of which is variable, runningwise of the type, by a variably interceptible throat controlling plunger, under tension to assume an extreme position; and which mold is, otherwise, of novel construction, with a view of rapidity of action; third, the relative arrangement of the devices, for moving and intercepting the matrix-block to select the matrices, and to set the mold-plunger, for fixing the running width of the mold throat; fourth, the distant separation of the melting pot and type-body mold with its connected mechanism, and the transmission of the molten metal from the distant melting pot to the throat of the mold, by a tube closed into an electric circuit, whereby the molten metal is delivered to the mold throat, at a constant and the exact temperature required for the best results in the cast, and whereby, all bad effects, which would, otherwise, be produced by the necessary proximity of the melting-pot on the mold joints and its connected parts are entirely obviated. This feature is described and broadly claimed in my pending application, Serial No. 463,303, filed February 23, 1893, entitled apparatus for casting molten materials; fifth, a reliable justifier, constructed on a novel principle, which is capable of being automatically set to control the variable spacing mechanism, at word spaces for any spacing required to justify the line; sixth, the relative arrangement of the electric connections and the representative controlling strip, for co-operation to control the operative parts of the machine; seventh, the special devices for insuring a positive and exact feed to the controlling strip, including means for making the feed needles always operate on slack sections of the strip; eighth, a simple construction and arrangement of the line delivery devices and the devices for setting the justifier.

Other features and sub-features of the construction will appear in the detailed description.

It may further be noted, that the representative controlling strip is fed to this machine in the reverse order to its making on the composing machine; or otherwise stated, that the working holes of the strip, last made on the composing machine come first into effect on the casting machine, thereby turning out the type set up in line from the right toward the left or from the end of the line backward to the front.

With the foregoing statements in mind, it will be easy to follow and understand the detailed description which will now be given.

A machine embodying my invention, is illustrated in the accompanying drawings, wherein like notations refer to like parts throughout the several views.

Figure 5:
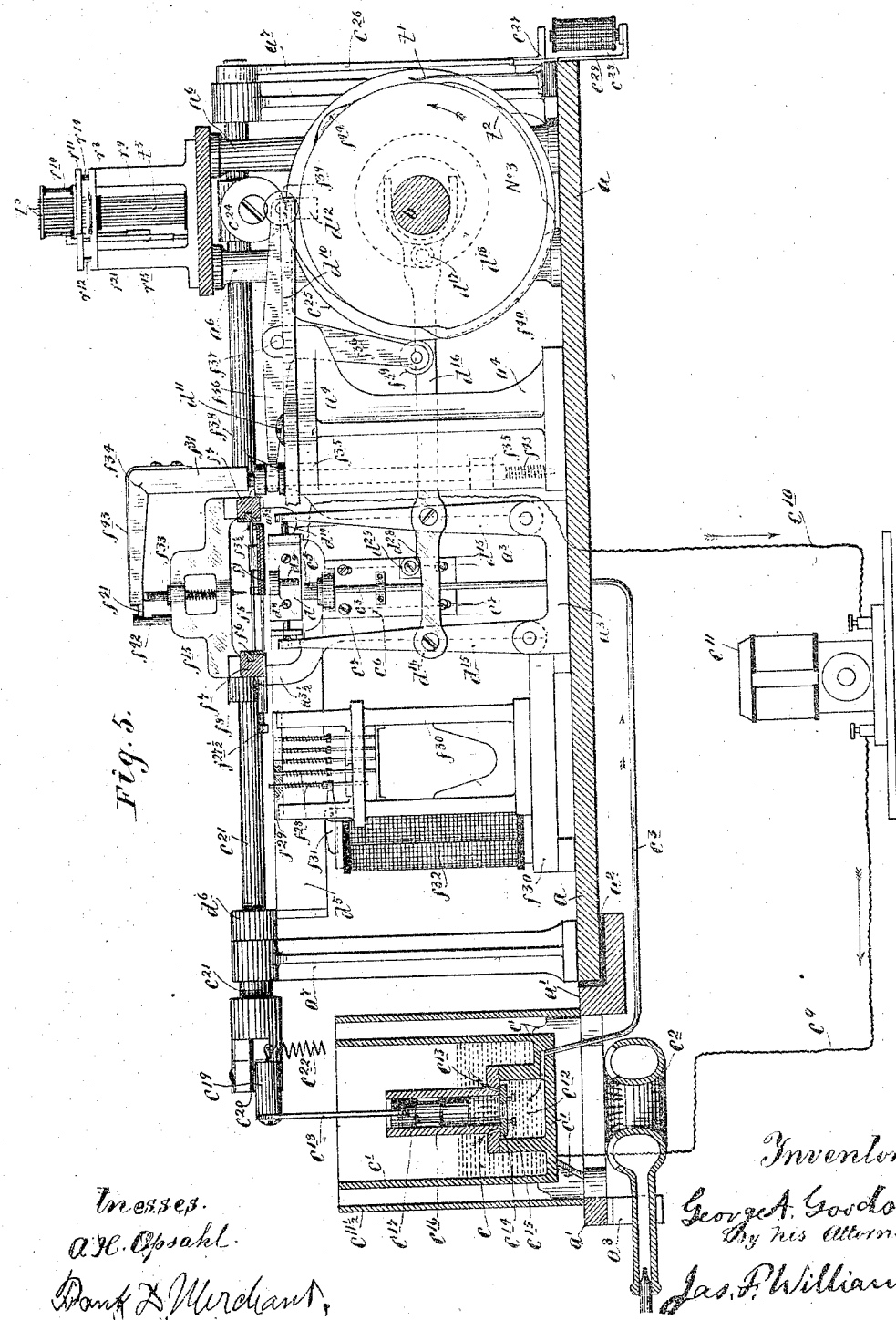
Figure 21:
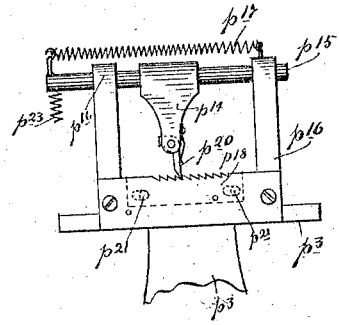
Figure 20:
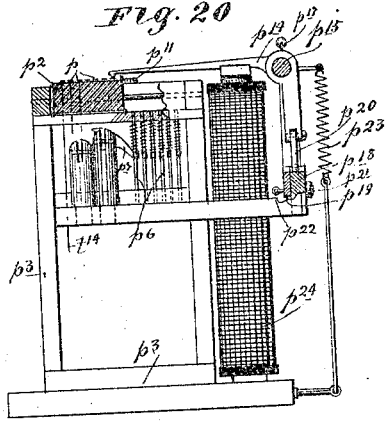
Figure 22:
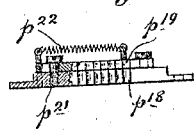
Figure 25:
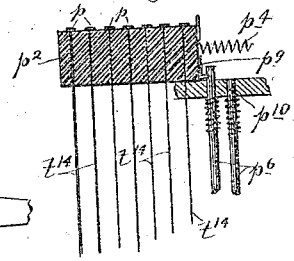
Figures 23, 24:
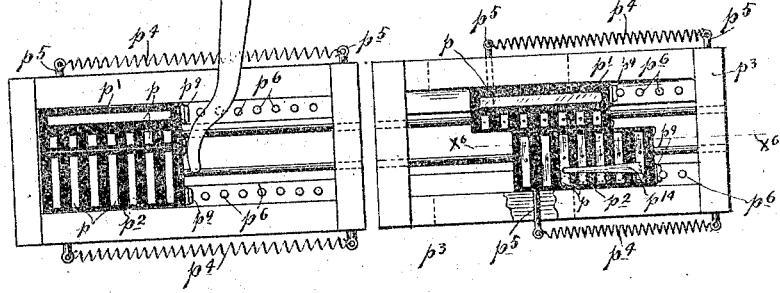
Figure 29:
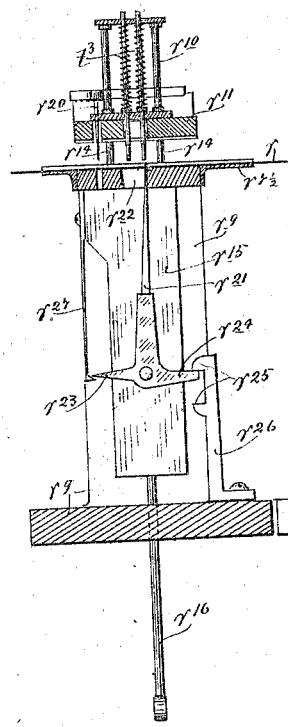
Figure 27:
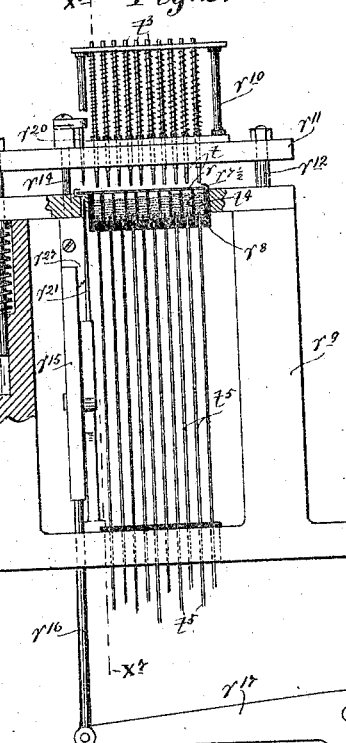
Figure 28:
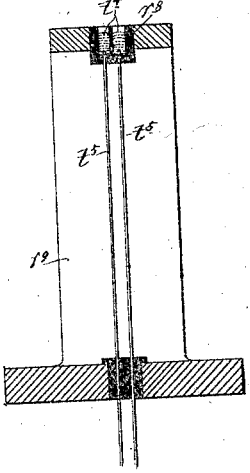
Figure 30:
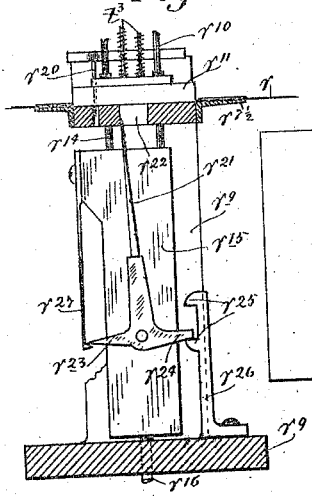
Figure 26:
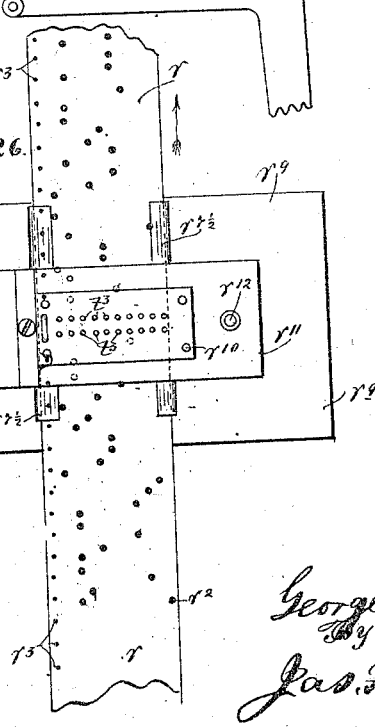
Figure 31:
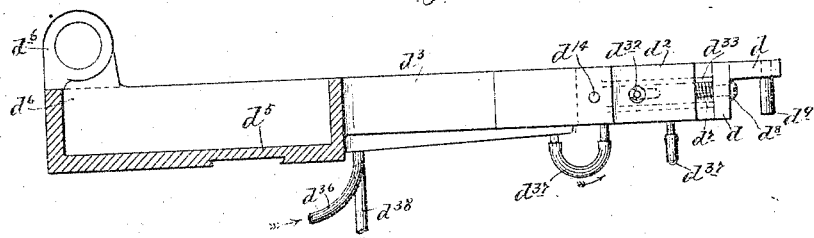
Figure 32:
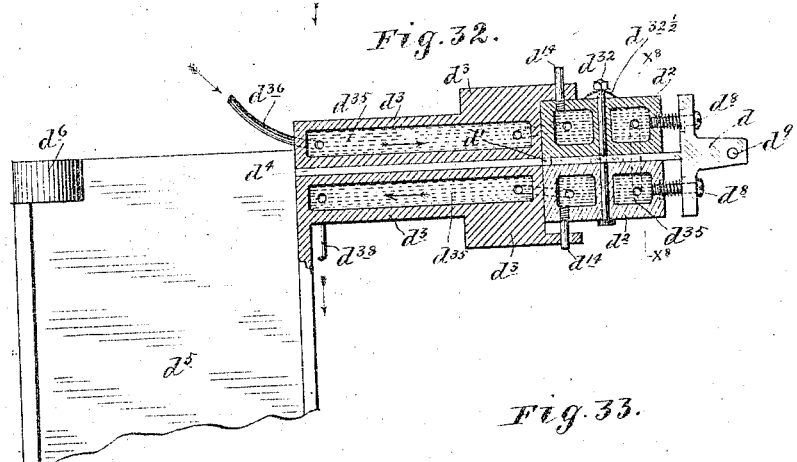
Figure 33:
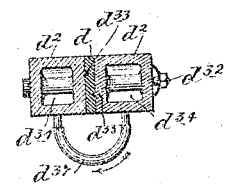
Figure 34:
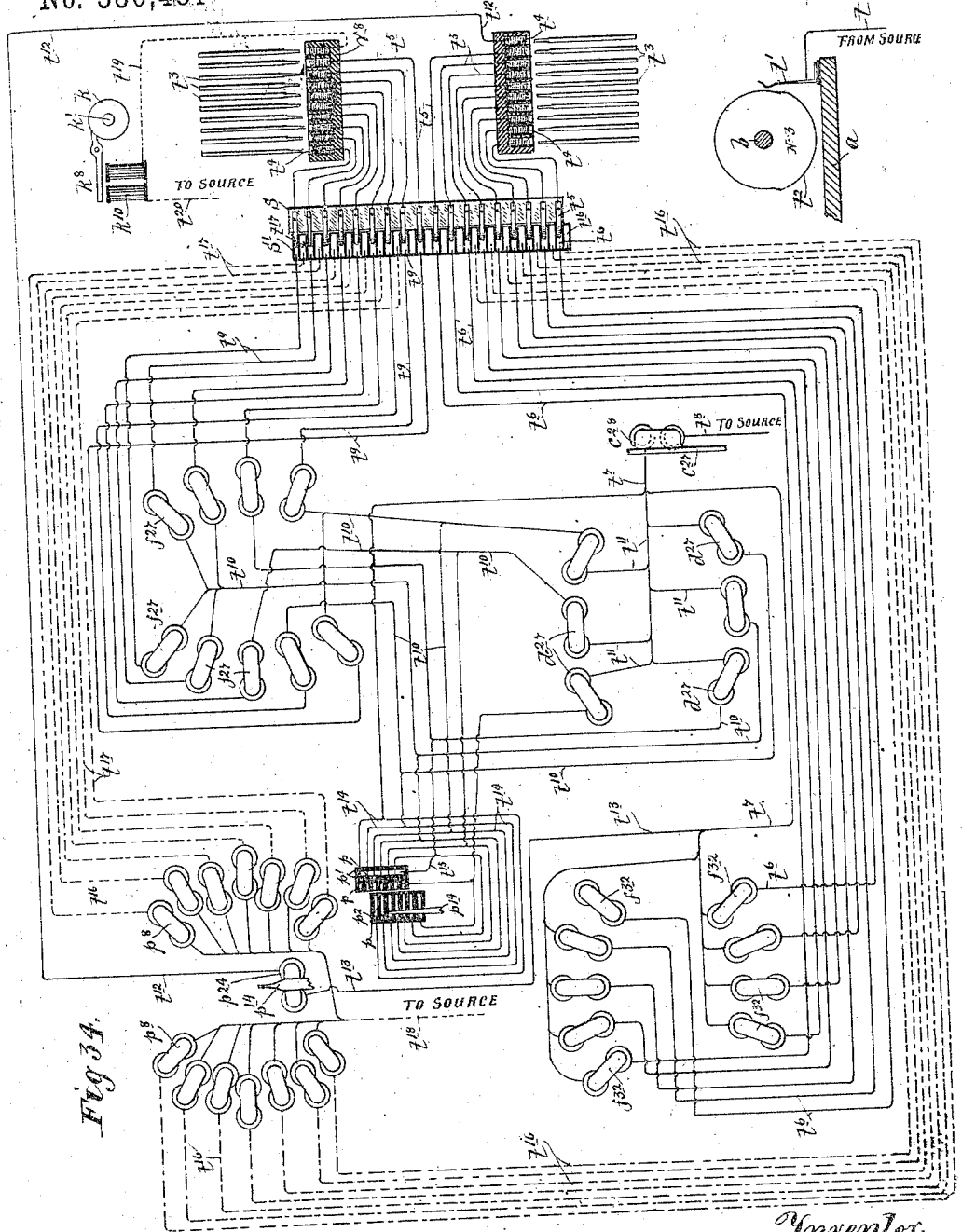
Figure 35:
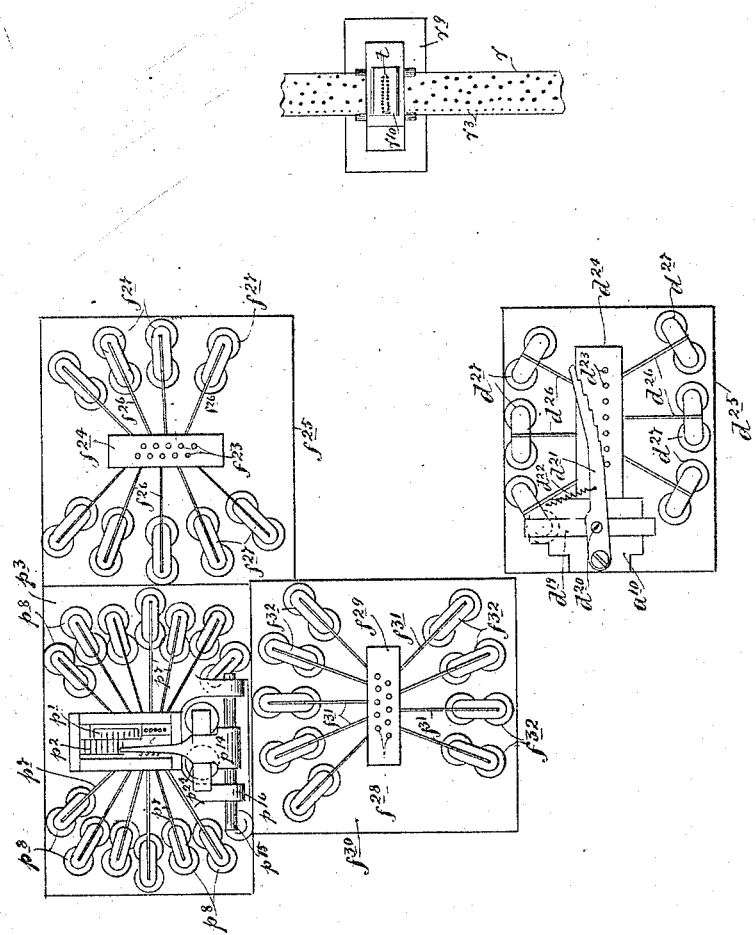

Figure 1 is a plan view, full size, of the representative controlling strip, under the control of which the machine is operated to produce justified lines of type. Fig. 2 is a right end elevation of the machine, some parts being broken away. Fig. 3 is a detail, in elevation and partial section, of some of the parts shown in Fig. 2, looking from the front. Fig. 4 is a plan view of the entire machine, some parts being broken away. Directions will be taken with reference to this view, from the position of an observer facing the front side of the machine. Fig. 5 is a longitudinal vertical section of the machine from right to left, on the irregular line X X of Fig. 4. Fig. 6 is a detail in plan view, with some parts broken away, showing the integral font matrix-block, with its carriage and support, detached. Fig. 6½ is a detail in underneath plan, showing the relation of the buffer-rod to the matrix-block, some parts being broken away, and others removed; and Fig. 7 is a detail in section, showing the same parts in relation to each other, and the guide-frame through which the buffer-rod passes. Fig. 7$^a$ is a bottom plan view of the matrix-block detached, full size. Fig. 7$^b$ is a section of same, right side up, on the line X' X' of Fig. 7$^a$, full size. Fig. 7$^c$ is a detail of matrices and type, double size. Fig. 8 is a detail of some of the parts shown in Fig. 4, in transverse vertical section, on the irregular line $X^2 X^2$ of Fig. 4, some parts being removed and others broken away. Fig. 9 is a detail, in vertical section, showing the casting tube nipple, contact yoke and their supporting keeper plates. Fig. 10 is a detail, in plan view, showing the type-body mold and some of its immediately connected parts detached. Fig. 11 is a detail in section to show type-nick rib. Fig. 12 is a skeleton view in plan, showing the justifier in position, looking from rear of machine. Fig. 13 is a vertical section of the relatively fixed part of the type-body mold, on the line $X^3 X^3$ of Fig. 12, looking from the rear toward the front, showing the type before it is tapped down. Fig. 14 is a similar view, looking in the same direction on the line $X^4 X^4$ of Fig. 12, after the type has been tapped down. Fig. 15 is a horizontal section, on the line $X^5 X^5$ of Fig. 14. Fig. 16 is a detail, in plan view, showing part of the line delivery devices detached. Fig. 17 is a view of the same parts shown in Fig. 16, turned over on their sides. Fig. 18 is a detail, partly in elevation and partly in section, with some parts broken away, showing the galley and the sliding galley head, for forcing the line of type into the galley. Fig. 19 is a detail, in rear elevation, showing the trip clutch device, part of the line delivery devices and part of the justifying mechanism, some parts being removed and others broken away. Fig. 20 is a left end elevation, with some parts in section, showing part of the justifier detached. Fig. 21 is a front view of the escapement mechanism shown in Fig. 20. Fig. 22 is a detail of the escapement racks, shown in Fig. 21, detached. Fig. 23 is a plan view of the justifier detached, with the combination blocks in their extreme rearmost positions, or ready to be set. Fig. 24 is a similar view of the same parts, with the combination blocks in their set position, for throwing in ten extra units of space, for purposes of justification. Fig. 25 is a vertical section, on the line $X^6 X^6$ of Fig. 24, through one of the combination blocks. Fig. 26 is a plan view, showing part of the controlling strip and the devices co-operating therewith detached. Fig. 27 is a front elevation of the thrust-pins, mercury contact-cells, feed-devices, &c., co-operating with the controlling strip, with some parts in section. Fig. 28 is a detail in vertical section on the line $X^7 X^7$ of Fig. 27, looking toward the right, showing a pair of the mercury contact cells, with wires and supporting pillow block. Fig. 29 is a vertical section, on the same line $X^7 X^7$ of Fig. 27, looking from the right toward the left, showing the feed needles, in one of their extreme positions. Fig. 30 is a similar view, showing the feed needles in their opposite extreme position. Fig. 31 is a detail in left side elevation, of the type-body mold, and Fig. 32 is a view of the same partly in plan and partly in horizontal section; for showing the water jacketing of the mold. Fig. 33 is a cross section of the shifting mold section on the line $X^8 X^8$ of Fig. 32. Fig. 34 is a diagram view, illustrating the electric connections. Fig. 35 is a diagram or outline view, illustrating the relative position of the controlling strip, the different groups of stop magnets, and the stops controlled thereby, for positioning the matrix-block and the plunger of the variable type-body mold. Figs. $35^a$ and $35^b$ are details in vertical section, showing the spring-seated stops for intercepting the matrix-block, in relation to the armature-levers and magnets, by which they are operated. Fig. $35^c$ is a similar detail in vertical section, showing the relation of the spring-seated stops, which intercept the mold-plunger, to the armature-levers and magnets controlling the same; and Fig. $35^d$ is a similar detail in vertical section, with some parts broken away, showing the spring-seated justifier stops in relation to their armatures and magnets, for operating the same. Fig. 36 is a plan view of a modified form of the justifier. Fig. 37 is a vertical section of Fig. 36, on the line $x^9 x^9$. Fig. 38 is a vertical cross section on the line $x^{10} x^{10}$ of Fig. 36, looking from the left. Fig. 39 is a partial vertical section on the line $x^{11} x^{11}$ of Fig. 37. Fig. 40 is a plan view of another modified form of the justifier. Fig. 41 is a plan view, with some parts removed, showing a third modification of the justifier.

For convenience, the following classification of reference letters will be observed.

$a$ and its powers $a'$ $a^2$, &c., will be used to denote the bed and the various fixed parts secured thereto; $b$ and its powers, the driving shaft, &c.—the cams thereon being numbered, 1, 2, and 3, from rear to front; $c$ and its powers, the type metal and its conducting mechanism, &c.; $d$ and its powers, parts of the type-body mold, &c.; $f$ and its powers the matrices, parts of the matrix block, carriage, &c.; $g$ and its powers, the type and type delivering devices; $h$ and its powers, the clutch device; $p$ and its powers, the parts of the justifier, in the form incorporated in the machine as shown; $r$ and its powers, the controlling strip and its feed mechanism; $s$ and its powers, the parts of the two-way switch. $t$ and its powers, the electric connections for the magnets co-operating with the controlling strip, including the thrust pins, mercury cells and wiring therefrom; $w$, $y$, $z$ and powers, the parts of the modified forms of the justifier.

The parts will be specified, not necessarily in the order of their operation, but in that order thought to be most conducive to brevity of statement and ease of understanding.

*Main frame.*—The frame-work is composed of a sectional bed-plate $a$ $a'$, the two sections of which are insulated from each other, as shown at $a^2$; a central anvil or pillow-block $a^3$ with upwardly extending lugs $a^{3i}$; an adjacent lever-supporting standard $a^4$; main shaft bearings $a^5$; strip-shelf supporting standards $a^6$; rocker-rod bearing standards $a^7$;—all rising from and rigidly secured to the bed-sections $a$;—a keeper bracket $a^8$ under the left edge of the bed-section $a'$; a spring stud $a^9$; slide standard $a^{10}$; and suitable supporting legs. (Not shown.)

*Driving shaft and its cams.*—(See Figs. 2, 3, 4 and 5.) Transversely of the bed-section $a$, at the right end of the machine, in the shaft bearings $a^5$ and between the shelf-standards $a^6$, is mounted the single driving shaft $b$; which is provided with a driving pulley $b'$, at its front end, and carries a series of three cam-wheels numbered respectively, from the rear toward the front, No. 1, No. 2, and No. 3. The cam wheels No. 1 and No. 3, have several cam-surfaces, which will be noted in connection with the parts operated thereby. The driving shaft $b$ is kept in constant motion.

*The type-metal and its conducting mechanism.*—(See Figs. 4, 5, 8 and 9.) Type-metal $c$ is kept, in a molten condition, within a remotely located melting-pot $c'$, by flame from a suitable burner $c^2$ held in position thereunder by the keeper-bracket $a^8$; and the molten metal is forced, from the melting pot, to the mouth of a distant type-body mold, presently to be noted, through an insulated electrically heated steel tube $c^3$ drawn to a fine pointed nipple-end $c^4$; which nipple is ocated in position to discharge directly into the mouth of the type-body mold. The nipple end $c^4$ of said tube terminates in and flush with the top surface of a contact yoke $c^5$, of relatively large mass and corresponding low resistance, as compared with the said nipple $c^4$. The contact-yoke $c^5$ is rigidly secured to and insulated from a combined keeper and clamping plate $c^6$ (see Fig. 9) having slot and screw connections, as shown at $c^7$, with the front face of the pillow block $a^3$, whereby it is permitted a limited up and down movement. The tube $c^3$ is provided with a flange or collar $c^8$, rigidly secured thereto, which is clamped between and insulated from the legs of the contact yoke $c^5$ and the top of the angularly extended head of the plate $c^6$; which construction serves to securely hold the tube and nipple, in their proper working positions, and permits the tube and contact yoke to be moved with the sliding plate $c^6$. The tube has sufficient spring, to permit of this limited vertical movement with the plate $c^6$. Wires $c^9$ and $c^{10}$ connect the melting pot $c'$, the tube $c^3$, together with the metal therein, and contact-yoke $c^5$, into an electric circuit from a dynamo $c^{11}$, or other source of supply, adapted to furnish a quantity or low tension current. The melting pot $c'$ is supported on the insulated bed-section $a'$ and is entirely insulated from the bed-section $a$ and all the parts supported thereby, and is incased by a suitable housing $c^{11¼}$. The current supplied from the dynamo $c^{11}$, or other source, may, through a suitable converter (not shown), be accurately gaged in quantity for any desired degree of heat. Hence, if the molten metal comes from the melting pot into the conducting tube at too low a temperature, it will be heated to the required degree by the current; and if the metal comes into the conducting tube too hot, its temperature will be lowered to the point permitted by the current. The melting pot may, therefore, be as far removed from the nipple or casting point, as may be desired to obviate the bad effects on the mold mechanism; while the molten metal may be delivered from the nipple, at any exact temperature found desirable for the best results in the cast. The difference between the relative masses of the nipple $c^4$ and the contact-yoke $c^5$, is so great that the nipple tip may be red-hot or at any temperature desired, while the contact-yoke $c^5$ will be cool, or remain at so low a temperature as not to impart any objectionable amount of heat to the mold section, which comes in contact therewith. The break or jump in temperature, between the nipple and the contact-yoke, may be made as marked as that between the filament and the terminals of an incandescent lamp. The top surface of the contact-yoke $c^5$ forms the bottom wall of the body-mold throat, as will later appear. The important result of this electric feature, for conducting the molten metal, is an increase in the speed of the casting and an improved quality in the type, enabling the type to be cast without gates and with so little burr as not to require dressing.

The metal is forced from the melting pot by a pump which may be of any suitable construction; but which is shown as composed of a well $c^{12}$ with inlets $c^{13}$ controlled by a gravity valve $c^{14}$ riding on fixed guide-pins $c^{15}$; a cylinder $c^{16}$ extending upward from the top plate of the well, and fitted with a plunger $c^{17}$. When the plunger $c^{17}$ is raised, the metal will be forced into the well by atmospheric pressure, the gravity valve $c^{14}$ lowering to its limit on the pins $c^{15}$. When the plunger is lowered, the reaction from the metal within the well, under the pressure from the plunger, will raise the gravity valve $c^{14}$ and close the inlets $c^{13}$; thereby permitting the pressure from the plunger to become effective to force the molten metal, inside the well, through the tube and nipple into the mouth of the mold.

The pump plunger $c^{17}$ is connected by link $c^{18}$ to one section of a rocker arm $c^{19}$, the two sections of which are insulated from each other, as shown at $c^{20}$. The said rocker arm is rigidly secured to the left end of a long rocker rod $c^{21}$, mounted in the bearings standards $a^7$. The rocker-arm $c^{19}$ is subject to the action of a strong spring $c^{22}$ connecting the same to a projection $a^9$ from the left end of the bed-section $a'$. Near its right hand end, the rocker rod $c^{21}$ is provided with a cam-lever arm $c^{23}$ with roll $c^{24}$ subject to the action of a peripheral cam-surface $c^{25}$, on the cam-wheel No. 1. The high part of the cam-surface $c^{25}$ raises the lever-arm $c^{23}$, the rocker-arm $c^{19}$ and the pump plunger $c^{17}$, into their uppermost position, against the tension of the retracting spring $c^{22}$. When the cam-lever roller $c^{24}$ is permitted to fall to the lower or depressed part of the cam surface $c^{25}$, the springs $c^{22}$ is permitted to become active, thereby actuating the pump plunger, to effect its downward stroke and make the cast. In order to insure the retention of the pump plunger in its raised position, at all times, except when a cast is desired, regardless of the revolutions of cam-wheel No. 1, the said rocker-rod $c^{21}$ is provided, at its right hand end, with a latch-arm $c^{26}$, which is normally engaged by an armature catch lever $c^{27}$, thereby rendering the pump actuating parts inactive. The armature catch-lever $c^{27}$ is subject to the action of a spring $c^{27¼}$ and an electro magnet $c^{28}$, supported from bracket $c^{29}$, at the right hand corner of the bed-section $a$. The upward movement of the catch-lever $c^{27}$ is limited by a link $c^{30}$ having a slot and pin connection $c^{31}$ with the bed section $a$. The circuit through the latch-lever or pump releasing magnet $c^{28}$ is controlled, by means which will be hereinafter described, to release the latch-arm $c^{26}$ and permit the pump actuating parts to assume their active positions. It will thus be seen that the pump is electrically controlled.

It should be noted, that the strain from the pump spring $c^{22}$ is sustained entirely by the high part of the cam surface $c^{25}$ on cam-wheel No. 1, when the catch-lever $c^{37}$ is tripped by the energizing of the magnet $c^{28}$. Otherwise stated, while the roller $c^{24}$, on the cam-lever $c^{23}$, rides on the high part of the cam surface $c^{25}$, on said cam-wheel No. 1, the pump plunger will be held up against the down pull of the pump spring $c^{22}$; which time includes nearly the whole revolution of said cam-wheel No. 1; and, during this time, there will be no strain from the latch-arm $c^{26}$ on the catch-lever $c^{27}$. Before the said roller $c^{24}$ reaches the low part of the cam surface $c^{25}$, the trip will have been made, provided a cast is to be taken. In virtue of this construction, the magnets $c^{28}$ can be made small and sensitive, whereby the trip is rendered quick in its action.

By the means so far described, the molten metal may be delivered at the right temperature, from the nipple $c^4$ into the mouth of the type-body, which is now about to be described.

*Type-body, mold, &c.*—(See Figs. 2, 4, 5, 8, 10 to 15, and 31 to 33.) The type-body mold involves a running with throat controlling plunger $d$, working in the throat channel $d'$, of a two part shifting section $d^2$ movable transversely of and forming a close joint with a relatively fixed section $d^3$ provided with a delivery channel $d^4$. The relatively fixed mold section $d^3$ is extended toward the rear and formed integral with a galley seat $d^5$, which is loosely pivoted, by bearing lugs $d^6$, to the rocker-rod $c^{21}$. This permits the mold and galley seat to be turned upward and backward, as shown in dotted lines, in Fig. 8, for exposing the under side of the mold and the top of the nipple $c^4$ and contact yoke $c^5$. The type body mold rests, when in working position, on the top of the pillow or anvil block $a^3$, between lower shoulders of the upwardly projecting curved lugs $a^{34}$ thereon, the upper shoulders of which lugs $a^{34}$ serve to form rests for and prevent lateral motion of the matrix block carriage hereinafter noted.

The mold-plunger $d$ is under tension to assume its outermost position—or position required for the widest running width of type-body—from coiled-springs $d^7$ encircling screw-headed guide-pins $d^8$ connecting the head of the plunger with the body of the shifting mold section $d^2$. The head of the mold plunger is provided, on its outermost projecting part, with a downwardly extended pin $d^9$, which works between and is subject to the action of the prongs of a forked type ejecting lever $d^{10}$, pivoted to the top of the standard $a^4$, as shown at $d^{11}$. This lever $d^{10}$ extends toward the right, beyond its pivotal fulcrum, and has, at its rear end, a roller $d^{12}$ working in a cam-channel $d^{13}$ cut in the periphery of the cam wheel No. 3; by means of which cam-channel $d^{13}$ the said lever is rocked in the horizontal plane, to impart and permit the required motions, at the required times, to the said mold-plunger $d$.

The shifting body mold section $d^2$ is provided with laterally projecting guide studs $d^{14}$, which work through projecting parts of the relatively fixed section $d^3$, and are embraced, at their ends, by a pair of vertical shifting arms $d^{15}$ pivoted at their lower ends to the foot of the pillow-block $a^3$. These arms $d^{15}$ are pivotally connected to a shifting cam-rod $d^{16}$ forked at its right end, to embrace the driving shaft $b$, and provided with a roller $d^{17}$, working in an eccentric cam channel $f^{18}$ cut on the rear side face of the cam-wheel No. 3. By this cam-channel $d^{18}$, on wheel No. 3 and the connections $d^{16}$ $d^{15}$, the shifting mold section $d^2$ is given its proper movements, at the proper times, for assuming respectively its casting and ejecting positions. The said shifting-section $d^2$ is, shown in its casting position, in Figs. 10 and 12, and, in its ejecting position, in Figs. 4 and 5.

By reference to Figs. 10 and 12, it will be seen that the shifting section $d^2$ requires only an extremely small movement to throw the same from its casting into its ejecting position, or vice-versa.

Directly in front of the mold-plunger head and in line therewith, when in the casting position, is located a slide $d^{19}$, working in a suitable seat cut in the top of the standard $a^{10}$, which is indirectly supported from the bed section $a$. The slide $d^{19}$ is pivotally connected, as shown at $d^{20}$, to a stepped stop-lever $d^{21}$, pivoted to the top of the standard $a^{10}$, and subject to the action of a retracting spring $d^{22}$, which tends to make the stop-lever $d^{21}$ and slide $d^{19}$ follow the plunger $d$ in its ejecting movement. The tension on the mold-plunger $d$ from the springs $d^7$, tends to throw the said plunger, the slide $d^{19}$ and the stopped stop-lever $d^{21}$ into their outermost position, until intercepted by a fixed stop, which is one of a series of seven stops $d^{23}$, for co-operation with the stepped surfaces on the stop-lever $d^{21}$, to intercept the said stop-lever and the plunger $d$ in any one of seven different positions, to give the seven different required running widths of type-body. The said stops $d^{23}$ are all mounted in a guide-block $d^{24}$ fixed to the top of a magnet pedestal $d^{25}$, and all, except the extreme right hand or seven unit member of the same, are spring seated and movable in the said guide-block and are carried by the inner ends of armature levers $d^{26}$, pivoted on said pedestal and subject to the action of a corresponding series of electro magnets $d^{27}$, also supported on the said magnet frame. By suitable electric connections, which will be hereinafter noted, any one of the said six movable mold plunger stops $d^{23}$, may be thrown up where it will intercept the stop-lever $d^{21}$ and the mold plunger $d$ in any required position, to give the proper running width of body for types, ranging from one to six units in running width of face; and if none of the said movable members of the said stops are thrown up, the said lever $d^{21}$ will go to its limit against the outermost or seven unit fixed stop and give the proper body for a seven unit type face. It may be noted that the proper member of the mold plunger stops $d^{23}$ is set before the shifting mold section $d^2$ leaves its ejecting position; and that the play for the pin $d^9$ between the prongs of the ejecting lever $d^{10}$ is sufficient, to permit the plunger to be intercepted in any of its required positions, without interference from the outward stroke of the said lever $d^{10}$.

The shifting cam rod $d^{16}$ has a small cam surface $d^{28}$ which co-operates with a roller $d^{29}$ on the keeper plate $c^6$ to clamp the nipple $c^4$ and contact-yoke $c^5$ to the under surface of the body mold, at the proper time. The mold section $d^2$ has a type-nick rib $d^{30}$; and the mold section $d^3$ has a lock-rib $d^{31}$;—the actions of which part will more fully hereinafter appear.

The two parts of the shifting mold section $d^2$ embrace the mold plunger $d$, and are loosely held together to afford free play for the plunger, clearance for easy discharge of the type, &c., at all times, except when in the casting position, by a cross bolt $d^{32}$ and spring washer $d^{32\frac{1}{2}}$ connecting the same through a slot in the mold plunger $d$; but, when in the casting position, the said parts are tighly clamped together by the action of the right hand shifting arm $d^{15}$ and stud $d^{14}$ against the left hand projecting shoulder of the fixed mold section $d^3$. In this casting position, the shifting section is also tightly held, endwise, against the fixed section $d^3$ by the plunger springs $d^7$ reacting against the slide $d^{19}$, stop lever $d^{21}$ and the set member of the plunger stops $d^{23}$. The matrix block is clamped to the top surface of the mold, when in casting position, by means which will presently appear.

The plunger $d$ is held from vertical displacement by tongue and groove engagement, in its forward portion with the inner faces of the two parts of the shifting section $d^2$, as shown at $d^{33}$. (See Fig. 32.)

All the co-operating parts of the type-body mold, except the plunger $d$, are water jacketed. For this purpose, the fixed section $d^3$ and the two parts of the shifting section are recessed, as shown at $d^{34}$ (see Figs. 31 and 32) and are supplied with running water $d^{35}$ under pressure, from a suitable elevated reservoir or other source, through a flexible supply tube $d^{36}$, flexible circulating connections $d^{37}$ and waste tube $d^{38}$. By this water jacketing of the mold and the electric feature for transmitting and controlling the temperature of the molten metal, hitherto noted, the mold may be kept constantly as cold as desired, regardless of the speed or the continuity of the use of the same.

The nipple-section of the tube $c^3$ is vertically movable with the keeper-plate $c^6$, under the action of the shifting-lever $d^{16}$ and the roller $d^{28}$, as hereinbefore noted, to clamp the nipple against the bottom of the type-body mold; and, under the gravity of the parts and the spring in the tube $c^8$, the said nipple will be lowered to its limit away from the mold, as soon as permitted by the said shifting-lever $d^{16}$ and roller $d^{28}$, which occurs immediately after the cast is made. This downward movement of the said nipple, relieves the cast type, in the mold, instantly from the continued heat from the nipple, which would otherwise be applied thereto, thus enabling the metal in the mold to chill much more quickly. Hence, this movement of the nipple, relative to the mold, is an important feature in the practical operation of the machine.

*The matrix-block, &c.*—(See Figs. 4, 5, 6, $6\frac{1}{2}$, 7, $7^a$, $7^b$, $7^c$ and 8.) The type face molds or matrices $f$ are all formed integral with a common body plate $f'$, which taken with a hard steel stiffening plate $f^2$, a top steel centering plate $f^3$ with centering holes $f^4$ and an aluminum filling $f^{2\frac{1}{2}}$, constitute, when rigidly secured together, an integral font matrix-block, shown of full working size in Figs. $7^a$ and $7^b$. This matrix-block involves especial features of construction, perhaps vital to the machine, and, therefore, requiring detailed notice.

A complete font of the matrices $f$, including alphabets of upper and lower case letters, numbers and punctuation marks, &c., are formed in and integral with the body plate $f'$ of said block, and are separated from each other and justified into corresponding positions of uniform spaces on said plate by intervening walls or high surfaces $f^{\frac{1}{2}}$ of said plate, which walls $f^{\frac{1}{2}}$ are of uniform width body-wise and of variable width running wise of the matrices or type. The matrices are also arranged on the plate $f'$, on a bifactored principle, into rows in two directions, for selecting the matrices by a two-way movement of the matrix-block; and are further grouped, according to running width of face, into rows in one direction, for permitting the devices which intercept the matrix-block, to select the row, and the devices which intercept the body mold plunger, for fixing the running width of the mold throat, to be subject to control from a common source.

It might be possible to cut the matrices $f$ in a suitable plate $f'$, with the said matrices justified and arranged, in respect to each other as above noted, either by hand or with the use of an engraving machine; but with a view to perfection of the matrices $f$, uniform depth of all of the same, for securing corresponding uniform height in the type, absolute precision in the relative location of the matrices on the plate, and the minimum of size and mass in the matrix plate proper and the matrix block as a whole, the said plate $f''$ is made by a novel process, of my invention, which may be briefly stated as follows:

I first set up into a form a complete font of the most perfect available printer's type, in the desired arrangement; second, I separate and justify the same into corresponding positions of uniform spaces running wise, by the use of truncated or faceless filling type, varying in running width and ground down or otherwise formed to the desired height, and separate and justify the said type in the form body wise by rules or special furniture also ground down or otherwise formed to the desired height; and finally, I immerse the said form in an electro-plating bath, and, by deposit therefrom, obtain a fac-simile reverse or electro matrix film-plate of said form. In separating the electro-matrix-plate from the type, I pull out the type one at a time; and, when thus done, the separation is easy and the matrix is left perfect. It is not even necessary to cover the type with plumbago; and, it is not desirable to do so as a more perfect matrix is obtainable in the way above described. The foregoing statements as to the method of producing my matrix-block, and as to the facility with which the electro-matrix plate may be separated from the type are all based on my own working experience. I then back the matrix plate film with a metal suitable for body and obtain what might be called the electro matrix plate $f'$ for constituting the face of the matrix block.

It is obvious that the matrices $f$ and high surfaces or walls $f^{\natural}$ must reversely correspond exactly, in perfection of form, precision of location, relative depth of the matrices and height of the separating walls, to the form from which the electro-plate was made. By the use of the truncated or faceless type ground down lower than an ordinary quad to separate and justify the type, running wise, into uniform spaces, in the form, and rules or furniture correspondingly ground down, to separate and justify the type body wise in the said form, the resulting matrices $f$ are of such depth and the intervening walls $f^{\natural}$ of such height, as to give low quads and correspondingly high type face; or, otherwise stated, a part of the type body for character type, is cast with the type face in the matrix. This feature of construction and the resulting character type and quad type are shown in Fig. 7$^{c}$, double size.

The addition to the electro matrix plate $f'$, made as above described, of the hard steel plates $f^2$ $f^3$ and the aluminum filling $f^{2\natural}$, with the centering holes $f^4$ extending through the top plate $f^3$ and the aluminum $f^{2\natural}$ into the lower steel plate $f^2$, completes the matrix block of minimum size and mass, shown of full size, as already noted, in Figs. 7$^a$ and 7$^b$.

The purpose of justifying the matrices, into corresponding positions of uniform spaces on the matrix plate $f'$, is to insure absolute accuracy of centering into casting position with respect to arbitrary fixed points on the type body mold, by uniform steps of movement of the block; or, otherwise stated, this permits the two sets of stops (presently noted), by which the block is variably intercepted to select the matrix, and the holes $f^4$, on the block itself, by which, in co-operation with a centering pin (presently noted) the final centering of the matrices is effected, to be uniformly spaced apart.

The face plate $f'$ of the matrix block is shown as if having ten rows of ten matrices each—minus one matrix at the rear right hand corner of the rectangle, which position is left with a flush surface or high wall for use in casting quads; but, in practice, some of the rows need not be full, as all the positions are not required for a complete font.

In respect to groups, according to running width of face, there are only six groups inasmuch as the character type only range from two to seven units. As shown the front four rows of matrices are of four units, the fifth row of three units; the sixth row of two units; the seventh of six units; the eighth and ninth of five units; and the tenth, or rearmost row (so far as filled), of seven unit matrices.

The matrix block is mounted, by its bearing lugs $f^{3\natural}$, for sliding movement from right to left, on guide rods $f^5$ carried by and arranged transversely of a slide $f^6$; which parts $f^5$ $f^6$ make up the matrix block carriage, mounted for sliding movement from rear to front in a guide frame $f^7$. The guide frame $f^7$ is loosely pivoted, by its bearing lugs $f^8$, to the rocker rod $c^{21}$; and may, therefore, be thrown back whenever desired, for inspection or other purposes. The forward or free end of the frame $f^7$, when in working position, is supported and held on and between shoulders of the lugs $a^{3\natural}$ projecting upward from the pillow block $a^3$.

The bearing lugs $d^6$, for the mold, and the bearing lugs $f^8$, for the matrix block carriage frame, are separated and held to position on the rocker rod $c^{21}$ by collars $f^{8\natural}$ fixed to said rod.

On the slide plate $f^6$, is a bell-crank lever $f^9$ pivoted at its elbow to the plate, and having its forwardly projecting arm connected to the matrix-block by a slot and pin connection, as shown at $f^{10}$. The other arm of said bell-crank lever $f^9$ is connected, by a link $f^{11}$, with the left end of a pivoted lever $f^{12}$, pivoted to a bearing lug $f^{13}$ on the guide-frame $f^7$. The said lever $f^{12}$ is subject to the action of an impelling spring $f^{14}$, which connects the same with a fixed yoke bar $f^{15}$, near the front end of the guide-frame $f^7$, over the centering position of the matrix-block. At its rear end, the lever $f^{12}$ is under the control of a cam-lever $f^{16}$, which is rigid with an idle pivot-shaft $f^{17}$, pivoted in the bed-section $a$ and a top bearing lug $f^{18}$ on the shelf which supports the strip mechanism. The lever $f^{16}$ has, at its rear end, a roller $f^{19}$ (see Figs. 2 and 3) subject to the action of a profile cam-surface $f^{20}$ on the rear side face of cam-wheel No. 1. The lever $f^{16}$ has a bearing roller $f^{21}$ at its forward end. The cam-surface $f^{20}$ is inclined or graduated in both directions, for cushioning or restricting the action of the impelling spring $f^{14}$, when positioning the matrix-block, as shown in Fig. 6; and, for restoring the matrix block to its normal or initial position, as shown in Fig. 4. It will be seen, by reference to Figs. 4 and 6, that the spring $f^{14}$, acting through the link $f^{11}$ and bell-crank $f^9$, will throw the carriage $f^5$ $f^6$ to its extreme forward position, and the matrix-block to its extreme left-hand position on the carriage, if the matrix-block be otherwise unintercepted. The movement imparted by the spring, were it not for the control of the cam-surface $f^{20}$, would be sudden and produce objectionable momentum in the matrix-block, with a rebound when intercepted; but, by the cushioning or controlling action of the cam-surfaces $f^{20}$, the matrix-block is held or restricted to a timed movement, and may be intercepted at any point without shock or jar, thereby rendering the block easy to center and capable of rapid action. The two-way movement of the matrix-block, by the single bell-crank lever $f^9$ and its single set of connections from a single cam-surface, affords a very simple construction.

The matrix-block is intercepted, in its forward movement, to select the row by intercepting the carriage $f^5 f^6$; and in its transverse movement, to select the individual of the row, by intercepting the block itself, in its transverse movement on the guide-rods $f^5$. The carriage slide plate $f^6$ has a downwardly projecting catch-lug $f^{22}$, engageable with any one of ten row selecting stops $f^{23}$, all of which are mounted in a suitable block $f^{24}$, supported by magnet pedestal $f^{25}$. The forward member of the said stops $f^{23}$ is stationary, and the other nine are spring-seated and movable in said block $f^{24}$, as a guide, and normally stand below the top surface of the same. The movable members of the stops $f^{23}$ are carried on the inner ends of armature levers $f^{26}$, pivoted to the magnet pedestal or frame $f^{25}$ and subject to the action of a corresponding series of electro magnets $f^{27}$. If the matrix-block be permitted to move forward to its limit, to select the rearmost row, it will be selected by the stop-lug $f^{22}$ engaging the foremost or stationary member of the stops $f^{23}$. For the selection of any other row, the forward movement of the block will be intercepted by the proper one of the movable members of said stops, through the energizing of the corresponding proper member of the magnets $f^{27}$. The electric connection to these magnets will be noted later on.

The matrix-block has loosely secured thereto by a sliding joint connection, a laterally projecting buffer-rod $g^{27\frac{1}{2}}$. The said sliding joint connection (see Figs. $6\frac{1}{2}$ and 7) is effected by a grooved head $f^{9\frac{1}{2}}$ on the said buffer-rod, and a flange $f^{9\frac{3}{4}}$ on the side of the matrix-block, engaging the said groove in the said head on the said rod. The said buffer-rod extends outward through the adjacent side-bar of the carriage supporting-frame $f^7$ and through a guiding projection $f^{5\frac{1}{2}}$ thereon. Hence, the buffer-rod $g^{27\frac{1}{2}}$ will permit the matrix-block to slide thereon in its forward and backward movement, but will be moved with the matrix-block in its to-and-fro lateral movements. The said buffer-rod $g^{27\frac{1}{2}}$ is engageable with any one of ten stops $f^{28}$ in a guide-block $f^{29}$, fixed to the magnet pedestal or frame $f^{30}$, for intercepting the matrix-block in its lateral movement, for selecting the particular matrix in the line. The rearmost of the said stops $f^{28}$ is stationary, and the other members are spring-seated and movable and carried by the inner ends of armature levers $f^{31}$, pivoted to the magnet frame and subject to the action of a corresponding series of electro-magnets $f^{32}$, on said magnet pedestal $f^{30}$. If the matrix-block be permitted to go to its limit against the stationary member of the stops $f^{28}$, it will give the extreme left-hand position or right end matrix of each row. For any other individual matrix of any row, the proper corresponding movable stop will be thrown up to intercept the block, by energizing the proper corresponding member of the magnets $f^{32}$. The electric connections for the magnets $f^{32}$ will be hereinafter noted.

When the block is permitted to come to the extreme of its forward motion, and to the extreme left of its transverse movement, as shown in Fig. 6, the extreme right hand rear corner or flat flush surface of the block will be over the throat of the body mold, as required for casting quads. When the matrix block is at its extreme rearmost and right hand position, as shown in Figs. 4 and 5, the front left hand corner, outside the rectangle, will be in position over the cast type, and will be utilized for tapping down the type, after it is delivered from the shifting mold section $d^2$ into the delivery channel $d^4$ of the stationary mold-section $d^3$. This tapping point is marked on the top of the matrix-block by a shallow countersunk hole $f^{4\frac{1}{2}}$ on the face of the top steel plate $f^3$. The slide $f^6$ of the matrix-block carriage has also a projection $f^{6\frac{1}{2}}$ adapted to strike the fixed buffer $f^{7\frac{1}{2}}$ on the frame $f^7$, to cushion the carriage at the rearward limit of its movement.

In the yoke-bar $f^{15}$ is located a spring-seated vertically movable centering pin $f^{33}$, for engagement with the centering holes $f^4$ in the top plate of the matrix-block, for centering and clamping the matrix-block accurately in its various required positions. In other words, by the bell-crank $f^9$ and its connections, under the co-operation of the spring $f^{14}$ and the cam surface $f^{20}$, the matrix-block is approximately located, in its various required positions, according as it may be intercepted by the co-operating stops $f^{23}$ and $f^{28}$; but the said block is finally centered and held in the exact positions required, by the centering-pin $f^{33}$, against the top of the type body mold. To these ends, the centering holes $f^4$, in the matrix-block, must be located with absolute precision. This I accomplish by locking in the body mold, in succession, the identical type from which the electro plate matrices $f$ were made, then bringing the matrix-block into corresponding positions and clamping the same down to the mold with the corresponding matrix over the corresponding type; and, when thus centered, drill the centering holes $f^4$ by a drill mounted in the bearings afterward occupied by the centering pin $f^{33}$.

For properly operating the centering pin $f^{33}$, the same is subject to a cam controlled pressure applying device, comprising a vertically movable swiveled plunger $f^{34}$ seated in guide-lugs $f^{35}$ on the rear face of the standard $a^4$; a two-armed and two-rolled cam-lever $f^{36}$ pivoted to the standard $a^4$, as shown at $f^{37}$, and having its forward end connected to the plunger $f^{34}$ between collars $f^{38}$. The rollers $f^{39}$ of the said cam-lever $f^{36}$ are subject to a peripheral cam-surface $f^{40}$ on cam-wheel No. 3. By the action of this cam-surface $f^{40}$, on one of the rollers $f^{39}$ the plunger $f^{34}$ is thrown down, at the proper time, to force the centering pin $f^{33}$ into the selected centering hole $f^4$, to center the matrix-block and clamp the same down onto the top of the body-mold, where it is held by the said cam-surface $f^{40}$, until after the cast is taken. Slightly before the clamping action of the pin $f^{33}$ on the matrix-block, the plate $c^6$, tube nipple $c^4$ and contact yoke $c^5$ are thrown up and clamped against the under surface of the body mold, by the co-operation of the small cam surface $d^{28}$ on the mold shifting lever $d^{16}$, and the roller $d^{29}$ on the said plate $c^6$, which clamping action on the nipple and contact yoke also continues until after the cast is made. When the cast is completed, the said cam-surface $f^{40}$ on cam-wheel No. 3 comes in contact with the other or lower member of the rollers $f^{39}$ on the lever $f^{36}$, to restore the plunger $f^{34}$ to its uppermost position, thereby releasing the matrix block; and, by the co-operation of a projection $f^{41}$, at the left end of the clamping plunger-head $f^{34}$, and a catch-lug $f^{42}$ fixed to the yoke $f^{15}$, the guide-frame $f^7$ and the matrix-block will be positively lifted away from the top of the body-mold and from the cast-type, leaving the necessary clearance for the shifting movement of the mold section into its ejecting position. To permit the necessary yielding action on the centering pin $f^{33}$ by the plunger $f^{34}$, the head of the pin works freely, through a hole in the head of the plunger, against an overlying stiff flat spring $f^{43}$, secured to the plunger. This of course insures closeness of joints, under the clamping action, and also affords a safety point to avoid breakage or injury to the parts under the clamping strain. The cam-lever $f^{36}$ is also subject to a short tapping cam-surface $f^{44}$ on the cam-wheel No. 3, for actuating the plunger and centering-pin, to strike the matrix-block, after it has been restored to its normal or initial position, as shown in Figs. 4 and 5, to tap down the type, after they have been delivered into the delivery channel $d^4$ of the fixed mold section $d^3$. In this tapping action, the centering pin enters the shallow tapping hole $f^{4\frac{1}{2}}$ at the extreme left-hand front corner of the block outside the rectangle.

When the matrix-block is lifted away from the body mold and cast-type, the type is prevented from following the matrix block by the nick rib $d^{30}$ (see Fig. 11) in the shifting mold section $d^2$.

The swiveled plunger $f^{34}$ may be turned to one side, at will, to permit the carriage guide-frame $f^7$, and the type body mold to be turned back on their pivotal bearings, and is raised, after action of the tapping cam by a spring $f^{45}$.

*The type, and type delivering devices.*—(See Figs. 1, 2, 3, 4, 5 and 8 to 19.) The delivery channel $d^4$ in the fixed mold section $d^3$, is deeper than the mold throat channel $d'$ in the shifting mold section $d^2$, and is provided with a lock lug or short rib $d^{31}$, at its mouth, in line with the nick-rib $d^{30}$ of the mold-section $d^2$. As a type $g$ is ejected, by the mold plunger $d$, into the delivery channel $d^4$, it rides in on the lock-rib $d^{31}$ as shown in Fig. 13, to a point behind the same as shown in Fig. 15; and, when this has occurred, it will be tapped down by the centering pin and matrix-block, as hitherto described, into the position shown in Fig. 14. Hence, it cannot be thrown back into the mold-throat, but will be locked in the delivery channel, by the said lock-rib $d^{31}$. A banking plunger or type abutment piece $g'$, is fitted in the delivery channel $d^4$ and is under tension to assume its foremost position. As the type are ejected, one after the other, they force the banking plunger $g'$ toward the rear against the tension of its spring. The banking plunger has rack-teeth $g^2$ cut on its lower edge, which engage with the pinion $g^3$ on the right end of an idle shaft $g^4$ mounted in bearings $g^5$ fixed to the galley-box seat $d^5$. (See Fig. 19.) A coiled spring $g^6$ encircles the shaft $g^4$ and is secured thereto, at one end, and fastened, at the other, to one of the bearings $g^5$. By this means, the type banking plunger $g'$ is held under tension by the spring $g^6$. A line delivery rack $g^7$ is fitted in a seat in the fixed mold section $d^3$ opening from the channel $d^4$ and is provided, at its forward end, with the spring-catch $g^8$, which normally lies out of the path of the type, as they enter the delivery channel, with its back against a cam-surface $g^9$ on mold section $d^3$, by means of which, when the rack is moved rearward, the catch will be moved to the left and engage behind the last type delivered by the mold-plunger. The delivery rack $g^7$ extends rearward, through the galley seat $d^5$, and engages with a gear $d^{10}$ on stud-shaft $g^{11}$, mounted in the bearing $g^{12}$ fixed to the back of the said galley seat. The gear $g^{10}$ is provided, on its hub, with a pinion $g^{13}$ and is under tension, from the coiled spring $g^{16}$, to assume its extreme left-hand position, as required to hold the delivery rack $g^7$ in its foremost or normal position.

The stem of the rack $g^{14}$ has an adjustable collar $g^{17}$ engaged by a forked spring tip $g^{18}$ offset from and forming a part of a vertical lever $g^{19}$ pivoted at its lower end to the bed-plate, as shown at $g^{20}$, and connected by a pitman-rod $g^{21}$ with a crank-disk $k$, constituting the idle member of a trip clutch, capable of being operated from the driving shaft $b$. The stem of the rack $g^{14}$ has at its right end a stop collar $g^{14\frac{1}{2}}$ engageable with the adjacent bearing $g^{15}$ to limit the movement of the rack toward the right.

The relation of the abutment plunger $g'$ $g^2$ to the lock-rib $d^{31}$ in the delivery channel $d^4$ of the fixed mold section $d^3$, is essential, for keeping the type on their feet in proper position in the said delivery channel. The delivery rack $g^7$ with its spring-catch $g^8$, in relation to the fixed cam-surface $d^3$, is an important feature in the successful operation of this machine. It enables the delivery of the line of type to the galley at the proper time by an extremely simple, but nevertheless perfectly reliable device. The means for operating the abutment plunger $g'$ $g^2$ and the delivery rack $g^7$, may be greatly varied; but the devices themselves are essential, for the proper delivery of the lines of type.

*The clutch device.*—(See Figs. 2, 4 and 19.) The clutch member $k$ is loose on a stud-shaft $k'$, projecting from the rear face of the rear shaft bearing $a^5$, and carries a spring clutch-pin $k^2$, working through a hole in the wheel and engageable with a notch $k^3$ in the companion clutch member $k^4$ on gear-wheel $k^5$, which is also loose on the said shaft $k'$ and is kept in constant motion by engagement with a pinion $k^6$, on the rear end of the driving shaft $b$. The clutch-pin $k^2$ is normally held out of engagement with the notch $k^3$ by a cam-surface $k^7$ on an armature trip-lever $k^8$, pivoted to the bearing-block $k^5$, as shown at $k^9$, and subject to the action of spring $k^{8\frac{1}{2}}$ and clutch trip-magnet $k^{10}$, located on the bed section $a$. When the magnet $k^{10}$ is energized, the trip-lever $k^8$ will be drawn down and the clutch-pin $k^2$ be permitted to engage with the notch $k^3$ on the constantly running clutch-member $k^4$. The relative sizes of the pinion $k^6$ and the gear-wheel $k^5$, are such that the driving shaft $b$ will make two turns, while the clutch member $k$ makes a single revolution. The notch $k^3$ and the inner end of the pin $k^2$ are so shaped and arranged with respect to each other that when the clutch has made a little less than a complete turn, the pin $k^2$ will be intercepted by the cam-surface $k^7$ on the trip lever $k^8$, (if released from the magnets $k^{10}$) and cause the clutch pin to ride out from the notch $k^3$, thereby stopping the clutch-member. The electrical connections, for controlling the trip-magnet $k^{10}$, will appear later on. Whenever this clutch mechanism is tripped into action, the rack $g^{14}$ will be thrown to the extreme right, by the spring lever tip $g^{18}$, acting on the collar $g^{17}$, against the tension of the spring $g^{16}$ until intercepted by stop collar $g^{14\frac{1}{2}}$; and thereby, the delivery rack $g^7$ will be thrown to the extreme rear by the pinion $g^{13}$ and gear $g^{10}$, before the end of the half turn of the clutch, drawing with it the line of type $g$ and the abutment rack $g'$, until the type come in front of the mouth of the galley $k^{11}$, which rests on he seat $d^5$.

The galley $k^{11}$ is provided with a movable head $k^{12}$ connected, by its slide-piece $k^{13}$, with a pivoted lever $k^{14}$, and subject to the action of the spring $k^{15}$, tending to hold the galley head in its left-hand extreme position. The lever $k^{14}$ is pivoted to the galley seat $d^5$, at a point to the rear of the galley, as shown at $k^{16}$, and projects into the path of a spring-arm $k^{17}$ carried on the pitman $g^{21}$. After the rack $g^{14}$ is intercepted by its stop collar $g^{14\frac{1}{2}}$ coming against the bearing $g^{15}$, the offset spring tip $g^{18}$ of the lever $g^{19}$ will yield, under the further movement of the pitman $g^{21}$ toward the right, thereby permitting the spring-arm $k^{17}$ to rock the slide lever $k^{14}$ and throw the movable galley head $k^{12}$ toward the left against the line of type, thereby forcing the line of type into the galley against a piece of printers' furniture or abutment block $k^{18}$. When the clutch completes its half turn, the springs $g^6$ and $g^{16}$ will come into effect to throw the banking rack $g'$ and the line delivery rack $g^7$ again to the front, into their normal positions; and the lever $g^{19}$ will be moved to its extreme left by the continued movement of the clutch toward the end of its turn, when the clutch will be tripped out of action as before stated. The spring $k^{15}$ throws the galley-head $k^{12}$ to the right into its normal position, as soon as permitted by the retreating of the arm $k^{17}$ on pitman $g^{21}$. The galley-head $k^{12}$ is cut away, as shown at $k^{19}$, to give clearance for the racks $g'$ and $g^7$. The galley $k^{11}$ is shown as provided with one adjustable side wall $k^{20}$, having a slot and screw connection, as shown at $k^{21}$, with the galley-seat $d^5$, for accurately gaging the galley to the proper width for the line of type.

The clutch mechanism above described, in addition to the functions already named, also co-operates, through connections from the pitman $g^{21}$, in setting the justifier, which will now be described.

*The justifier.*—(See Figs. 4, 12, 19, 20 to 24, and Fig. 34.) The justifier will be best understood, after describing the electric connections for the entire machine; but it is desirable to enumerate its parts, at this point. The said parts, making up the justifier, are located at the extreme rear corner of bed-section $a$. Two of its elements consist of a pair of combination contact-blocks $p'$ $p^2$, shown as composed of insulating material, and carrying a series of contacts $p$ connected, as will later appear, with the mold stop magnets $d^{27}$. These combination-blocks are mounted for sliding movement in the top or head plate of a magnet-frame or pedestal $p^3$, and are under tension from springs $p^4$ connected to said frame, at one end, and to projections $p^5$, from the respective blocks, working in slots of the said frame. These blocks may be intercepted in any one of seven positions, by any one of corresponding series of seven stops $p^6$ for each block. These stops are spring-seated and movable in the frame $p^3$, and are carried on the inner ends of corresponding armature-levers $p^7$, pivoted to the frame $p^3$ and subject to the action of corresponding magnets $p^8$. The magnets are energized at the proper time, through connections hereinafter noted, to throw up the proper stops $p^6$, for intercepting the said contact blocks in their proper positions. Each block has at its forward end a catch-lip $p^9$, (see Fig. 25) engageable with a notch $p^{10}$, at the top of the stops $p^6$, for holding the stops in their set positions, after the magnets are de-energized.

A three-arm setting-lever $p^{11}$ is pivoted, as shown at $p^{12}$, to a projecting part of the magnet frame $p^3$, and has its rear end connected by a link $p^{13}$ with the pivoted vertical lever $q^{19}$, operated through the clutch mechanism, hitherto described. The central arm of the lever $p^{11}$ projects into position, to engage with the front faces of the contact blocks $p'\ p^2$, so as to throw the same to the extreme rearmost limit of their guide-ways, when the said lever $p^{11}$ is rocked toward the left, which occurs, as before indicated, at the time when the last cast line is being ejected. The forward arm of the lever $p^{11}$ is in position to strike and shift to the extreme left an escapement rocker contact $p^{14}$, by coming in contact with the right end of its sliding journals $p^{15}$, which are mounted in bearing guide-lugs $p^{16}$, rising from the magnet-frame $p^3$. This setting movement of the escapement rocker $p^{14}$ is made, against the tension of an impelling spring $p^{17}$, tending to throw the said rocker toward the left but normally prevented from so doing, by a pair of escapement racks $p^{18}\ p^{19}$ (see Figs. 20 to 22) engaged by a spring-held pawl $p^{20}$ on the tail-piece of said contact $p^{14}$. The rack $p^{19}$ is movable, with respect to the rack $p^{18}$, having slot and screw connection therewith, as shown at $p^{21}$, and is under tension from the spring $p^{22}$ connected to said respective racks. The escapement contact rocker $p^{14}$ is in the form of a bell-crank armature lever, normally held in its uppermost or open position by a spring $p^{23}$ but subject to the action of escapement magnet $p^{24}$, by which it may be drawn down to close a circuit through the set members of the contacts $p$ on the combination blocks $p'\ p^2$. Every time that the rocker $p^{14}$ is released from the magnet $p^{24}$, the pawl $p^{20}$ will be rocked by spring $p^{23}$ into engagement with the escapement or sliding rack $p^{19}$; and, under strain of the propelling spring $p^{17}$, will be permitted to make one escapement step, carrying with it the rack $p^{19}$ one notch or the limit of its slot. When the rocker $p^{14}$ is rocked in the other direction, by the attraction of the magnet $p^{24}$, the pawl $p^{20}$ engages the fixed rack $p^{18}$; and the rack $p^{19}$ recovers its step, under the action of its spring $p^{22}$. It is obvious, of course, that the impelling spring $p^{17}$ must be relatively strong as compared with the rack-spring $p^{22}$. As it will subsequently appear, the escapement magnet $p^{24}$ is energized every time a word-space is reached; and hence, as the rocker is charged from the bed of the machine, a circuit will be closed through some one of the contacts $p$ on the combination blocks $p'$ and $p^2$.

The escapement mechanism may be constructed for any number of steps, but is shown as constructed for five escapements, before the rocker will reach its extreme right-hand position; and these escapement steps and the combination blocks $p'\ p^2$ are so arranged that three of the escapement movements will take place over the block $p^2$ and two over the block $p'$. The contacts $p$ on the blocks $p'\ p^2$ may be said to correspond to the different possible word spacings, expressed in units, from one to seven, and have electrical connections with the corresponding seven mold plunger stop magnets $d^{27}$, for intercepting the mold plunger $d$ to give spacing quads of the proper width for justifying the line. After the rocker $p^{14}$, under its escapement movements, reaches the limit of its travel toward the right, it will continue to rock under the action of the spring $p^{23}$ and the magnet $p^{24}$, at word spaces, but will close a circuit through the long contact $p$ on block $p'$ for the normal spacing of two units. In other words, all the extra units and hair spacing required for justification, is done on the first four escapement movements of the rocker $p^{14}$. Hereinafter, for convenience, the units of spacing by way of addition, may be called "extras," and the spacing, by way of subtraction from normal, for hair spacing, may be called "intras." At this point, the justifier may be left for further elucidation, after describing the controlling strip and the electric connections, under which the machine is operated.

*The controlling strip, &c.*—(See Figs. 1, 2, 3, 4, 5, 26 to 30.) The representative controlling strip $r$ comes from the composing machine with every element of the composition represented by perforations therein, including perforations $r'$ representing the justification and a perforation $r^2$, for controlling the clutch trip magnet to start the clutch-mechanism, for delivering the line, and for co-operation with other parts to set the justifier. The strip also contains uniformly and accurately spaced feed-perforations $r^3$ on one margin. The strip comes from the compositor's machine wound on an unwinding spool $r^4$; and is wound up, after use on the casting and setting machine, by a spool $r^5$. The spools $r^4$ and $r^5$ are mounted in bearings $r^6$, supported, together with other parts, from a shelf $r^7$ secured to the tops of the shelf standards $a^6$. The strip is fed, through a guide $r^{12}$ over the face of a mercury cell-box $r^8$, which is composed of insulating material and is supported by the pillow-block $r^9$ rising from the shelf $r^7$. At this point, the strip $r$ is subject to a series of spring-seated contact thrust-pins $t^3$, forming a part of the electrical connections hereinafter to be noted. The said thrust pins $t^3$ are carried by a skeleton-frame $r^{10}$ secured to the top of a thrust-bar or plunger-head $r^{11}$, spring-seated, by guide-rods $r^{12}$ and springs $r^{13}$, in the standards of the pillow-block $r^9$. The head $r^{11}$ is connected, by rod $r^{14}$, with a thrust-bar $r^{15}$ connected by rod $r^{16}$ to a bell-crank lever $r^{17}$, pivoted, as shown at $r^{18}$, and having a roller $r^{19}$ on its lower arm, (see Fig. 3) subject to the action of the peripheral and only cam-surface of cam-wheel No. 2. By the co-operative action of the cam-wheel No. 2 and the springs $r^{13}$, the head $r^{11}$ is given a reciprocating motion, at the proper times, in the vertical plane. The feed movement of the strip is effected by a pair of feed-needles $r^{20}$ and $r^{21}$; of which needles $r^{20}$ is fixed to the head $r^{11}$ and the needle $r^{21}$ is pivoted to the thrust-bar $r^{15}$. The pivoted needle $r^{21}$ works, at its upper end, in a limiting slot $r^{22}$ of the top-plate of the pillow-block $r^9$. The needle $r^{21}$ has laterally extending arms $r^{23}$, $r^{24}$, at its lower end, the latter of which is subject to cam-lugs $r^{25}$ on a bracket-piece $r^{26}$, projecting from the pillow-block $r^9$; and the former of which is subject to a spring-catch $r^{27}$, carried by the thrust-bar $r^{15}$, and operating to hold the needle, at either of its extreme positions, into which it may be thrown by the cam-lugs $r^{25}$. Under the co-operative action, of the thrust-bar $r^{15}$, and the cam-lugs $r^{25}$, the needles $r^{20}$ and $r^{21}$ are alternately thrown into the opposite extreme position shown in Figs. 29 and 30 and there held by the spring catch $r^{27}$. From an inspection of these views, it will be seen that the needles alternately engage with the strips $r$, and that the engagement of the one needle takes place when the strip is held stationary by the other. This feed mechanism is an exact duplicate of the combined feeding and feed puncturing mechanism used by the compositor's machine, to produce the feed perforations $r^3$ in the strip; and hence, the needles $r^{20}$ and $r^{21}$ will engage, in succession, with the said feed perforations $r^3$ and operate to feed the strip with a positive and exact movement. This nicety of feed is absolutely essential on a machine of this class; in order to position the representative perforations of the strip, for the proper co-operative action of the contact thrust-pins $t^3$. To further insure the accuracy and positive character of this feed to the strip, provision is made for enabling the feed mechanism always to operate on a slack section of the strip as shown in Fig. 2. The purpose of this is, to avoid any material strain coming on to the strip from the propelling needle $r^{21}$. If strain were permitted, the needle would tear the paper-strip and fail to accurately feed the same. To maintain this slack section in the strip, the spools $r^4$ $r^5$ are operated by a pair of small electric motors $r^{28}$, $r^{29}$, and suitable gearing, consisting of a pinion (not shown) on the armature shaft and spur-gears $r^{30}$, cut on the spools. The circuit through the motors $r^{28}$ and $r^{29}$ is controlled by the strip itself. The current is supplied to the motor $r^{28}$ by wire $r^{31}$, whence it passes through the frame to post $r^{32}$, having a pivoted contact $r^{33}$, tending to close the circuit through an insulated post $r^{34}$, and return wire $r^{35}$. Whenever the circuit is thus closed, by contact between the parts $r^{33}$ and $r^{34}$, the spool $r^4$ will be unwound; but as quick as a little slack occurs in the unwound section, it will drop onto the front end of the pivoted contact $r^{33}$ and break the circuit between the parts $r^{33}$ and $r^{34}$, thereby stopping the motor. This action will be repeated, whenever necessary to preserve the slack between the unwinding spool $r^4$ and the feed needles $r^{20}$ $r^{21}$. In a similar way, the motor $r^{29}$ is supplied with current by wire $r^{36}$, which passes thence to post $r^{37}$ having pivoted contact $r^{38}$, tending to break contact with the insulated post $r^{39}$, which is connected to the return wire $r^{40}$. Whenever any considerable slack occurs in the strip, between the feed needles and the wind-up spool $r^5$, the slack section of the strip will drop onto the rear end of the pivoted contact $r^{38}$ and close the circuit through the post $r^{39}$, causing the motor $r^{29}$ to wind up enough of the strip to take up the slack, when contact between $r^{38}$ and $r^{39}$ will be again broken and the motor $r^{29}$ be stopped.

*Electric connections for the magnets co-operating with the controlling strip.*—(See Figs. 2, 4, 5, 8, 19 to 35, especially Fig. 34.) It is desirable to distinguish three circuits, one of which may be called the working circuit; the second of which may be called the setting circuit; and the third of which may be termed the clutch trip circuit. The working circuit is converted into the setting circuit by a two-way switch, which is mechanically operated from the clutch device, under the control of the trip circuit. These so-called distinct circuits are all supplied with current, through the bed section $a$, from a common source, at the proper time, with respect to the revolution of the driving shaft $b$, under the control of the strip; but may be most conveniently treated as distinct circuits.

*The two-way switch.*—(See Figs. 8, 19 and 34.) A wooden bar $s$ constituting one of the switch members is fixed longitudinally of the bed-section $a$, near the rear edge of the same; and another wooden bar $s'$ constituting the other switch number is mounted alongside of the same and supported, with freedom for sliding motion, by slot and screw connection, as shown at $s^2$, with depending bearing-lugs $s^3$ fixed to the rear edge of the bed section $a$. The fixed switch member $s$ is provided with a single series of contacts, which will be treated as terminals of the wires from the mercury cells; and the movable member $s'$ is provided with a double series of contacts in alternate arrangement which will also be treated as terminals of the wires connected thereto. A sliding motion may be imparted to the movable switch member $s'$, from the pitman $g^{21}$, through a downwardly extending arm $s^4$, depending therefrom, and working between a pair of projecting pins $s^5$ properly spaced on the rear edge of the said movable switch member.

*The wiring.*—(See especially Fig. 34.) The bed section $a$ is charged with current, at the proper time, from source wire $t$, through insulated spring contact $t'$ fixed to the bed, and contact surface $t^2$ on cam-wheel No. 3. The contact surface $t^2$ extends a little less than half way around the said cam-wheel; and hence the circuit may be closed at that point for a little less than a half revolution of the driving shaft $b$. The circuit is normally open between the contact $t'$ and $t^2$. The spring seated thrust-pins $t^3$ co-operate, through the working holes of the representative controlling strip, with the corresponding mercury contact cells $t^4$, in the insulating trough $r^8$, as hitherto noted. From nine of each series of said cells $t^4$, extend corresponding wires $t^5$, eighteen in all to the fixed switch member $s$. The two sets of nine wires $t^5$ have their switch terminals on opposite sides of the center of the said fixed switch member $s$. Nine wires $t^5$ extend from their terminal on the movable switch member $s'$ to the individual stop magnets $f^{32}$, all of which magnets $f^{32}$ have a common return wire $t^7$ leading through the pump magnet $c^{28}$ and thence by wire $t^8$ to source. Nine wires $t^9$ lead from their terminals on the movable switch member $s'$ to the row selecting magnets $f^{27}$; and the return wires from the magnets $f^{27}$ unite into five wires $t^{10}$, extending to five of the six magnets $d^{27}$ controlling the movable members of the mold stops $d^{23}$; and the return wires $t^{11}$ from the mold magnets $d^{27}$ unite into one wire tapping the common return wire $t^7$ of the working circuit which extends through the pump magnets $c^{28}$, and whence wire $t^8$ leads to source. From the right hand or tenth member of the front series of mercury cells $t^4$, extends a wire $t^{12}$ running directly to the justifier escapement magnet $p^{24}$, whence, wire $t^{13}$ taps the common return wire $t^7$ of the working circuit leading through pump magnet $c^{28}$ and wire $t^8$ to source. The escapement rocker, operated for contact, by the above noted magnet $p^{24}$, gets current from the bed section $a$ of the machine; and two branch sets of seven wires $t^{14}$ extend from the series of contacts $p$ on the justifier combination blocks $p'$ $p^2$; of which seven wires $t^{24}$, five unite with the five wires $t^{10}$ leading from the row selecting stop magnets $f^{27}$ to five of the mold stop magnets $d^{27}$; a sixth, or one unit member, runs direct to the one unit mold stop magnet; and the seventh, or seven unit member, runs direct to the common return wire $t^7$ through pump magnet $c^{28}$, which it can do, because the seven unit member of the mold plunger stops $d^{23}$ is stationary requiring no magnet. The long two unit contract strip $p$ on the justifier combination-block $p^2$, connects by a special wire $t^{15}$ with a two unit member of the wires $t^{14}$.

The wires so far noted, make up what has been called the working circuit and are shown on the diagram, Fig. 34, in full lines. The movable member of the switch is shown as in position to close this working circuit.

Two sets of seven wires $t^{16}$ $t^{17}$ extend from their terminals on the movable member $s'$ of the switch, to the two sets of justifier stop magnets $p^8$; and the return from said magnets $p^8$ is made by a common wire $t^{18}$ leading directly to source. The said wires $t^{16}$ $t^{17}$ and $t^{18}$ co-operate with the wires $t^5$ and thrust-pins $t^3$, in one position of the movable member of the switch, to energize the magnets $p^8$ for setting the justifier stops $p^6$ to properly position the justifier combination blocks; and this circuit is therefore called the setting circuit; and the normally inactive wires $t^{16}$ $t^{17}$ and $t^{18}$, are shown on the diagram in broken lines.

From the right hand or tenth member of the rear series of mercury cells $t^4$ extends a wire $t^{19}$ to the clutch trip magnet $k^{10}$; whence extends a return wire $t^{20}$ leading to source. These wires $t^{19}$ $t^{20}$ are shown in dotted lines; and co-operate with the tenth or right hand member of the rear series of thrust pins $t^3$, and the bed connections, to form the so-called trip circuit.

The respective relations of the above noted several circuit connections will be rendered distinct, upon tracing the general operation of the machine, with respect to the control of said connections and the operative parts, by the representative controlling strip $r$; which operation will now be given.

*General operation.*—(a) With respect to the electric connections: The spring-seated contact thrust-pins $t^3$ are delicately and nicely mounted in their bearings; and when the thrust-bar $r^{15}$ is in its lowermost position, would all enter the mercury cells $t^4$, if unintercepted; but the controlling strip $r$, when in position, will intercept all of the said thrust-pins $t^3$, excepting only the particular members of said pins, which may be permitted to pass through working holes of said strip. Suppose that the strip $r$ is in working position in the guide $r^{7\frac{1}{2}}$ between the thrust-pins $t^3$ and the mercury cells $t^4$. Then, as the driving shaft $b$ starts, the contacts $t$ $t'$ will close, permitting the bed to be charged with current, and as the thrust-bar $r^{15}$ is lowered by cam No. 2, the fixed feed-needle $r^{20}$ will engage with one of the feed holes $r^3$ of the strip and hold the strip stationary; and, at the same time, the proper member of the thrust-pins $t^3$ will work through the trip-hole $r^2$, at the entering end of the strip, into the corresponding member of the mercury cells $t^4$, thereby closing the trip circuit and starting the clutch mechanism. The clutch will then make one complete turn, while the driving shaft $b$ makes two. During the first half turn of the clutch, the connections therefrom will deliver the line of type, previously cast, if any, shift the justifier escapement rocker $p^{14}$ into its extreme left-hand or set position, and throw the justifier combination blocks to their extreme rearmost position, ready to be set; and meantime, the cam No. 2, will have permitted the thrust-bar $r^{15}$ to have been raised to its normal position, by its retracting springs $r^{13}$ and permitting the pivoted feed needle $r^{21}$ to throw forward the strip one step, to bring the justification holes $r'$ of the strip into position for action. The first half turn of the clutch also shifts the movable member $s'$ of the switch, so as to render available the setting circuit. The trip circuit is opened between contacts $t'$ and $t^2$ before the thrust-pin is raised from the mercury cell. Just before the clutch completes its first half turn and just after the driving shaft starts on its second turn, the thrust-bar $r^{15}$ will again be drawn down, causing the proper pair of thrust-pins to co-operate with the justification holes $r'$ of the strip, to close the setting circuit, thereby energizing the justifier stop-magnets $p^3$, and setting the proper members of the justifier stops $p^6$. Hence, as the clutch moves on, to complete its turn, the combination blocks $p'$ $p^2$, will become subject to their springs $p^4$ and be properly intercepted by the set stops $p^6$, to position the said blocks as required, to make connections, afterward, on the working circuit, to justify the line. As the clutch completes its turn, the movable member $s'$ of the switch will be restored to its normal position, for rendering available the working circuit, and the clutch will be automatically thrown out of action. Meantime, the thrust-bar $r^{15}$ will have again been raised and the strip fed forward another step. Thereafter, the character holes of the strip will be brought into action in succession, to permit the thrust-pins to close the proper branches of the working circuit to energize the proper row selecting magnets $f^{27}$ and individual stop magnets $f^{32}$, for intercepting the matrix block to select the matrix, and the corresponding proper mold plunger magnets $d^{27}$, for intercepting the mold plunger to fix the running width of the mold throat. When the word space holes of the strip come into action, the escapement branch of the working circuit will be closed, over the wires $t^{12}$ $t^{13}$, through the escapement magnet $p^{24}$, which will thereby operate the rocker $p^{14}$ and cause the same to make contact with the particular contact-piece of the combination block then thereunder; thereby, closing the circuit from the bed over the said rocker and through the said contact and the proper member of the justifier wires $t^{14}$ to the proper corresponding mold stop magnets $d^{27}$, for intercepting the mold plunger, to fix the throat of the mold for quads of the proper size to justify the line. In this connection, it must not be forgotten, that when the word-space hole of the strip is doing its work, for word spaces, that the matrix block is permitted to go to its extreme forward and left-hand position against the stationary stops, requiring no magnets, and thereby bringing its extreme right hand rear corner or flush quad surface into the casting position, as required to produce quads. On reaching the end of the line, represented on the strip, the trip-hole $r^2$, at the retreating end of the strip, will come into effect, to again close the trip circuit, to deliver the line of type, and again shift the switch, for rendering available the setting circuit, &c., to set the justiner for the following line, in the same way as hitherto noted. As the pump magnet is on the return wire common to all branches of the working circuit, and has no connection with the setting or trip circuits, it is obvious, that the pump will be released only when a cast is required, and that, at all other times, the pump actuating mechanism will be locked in an inoperative position. It should be further noted, that the relation of the contact strip $t^2$ on cam-wheel No. 3, to the timing of cam-wheel No. 2 and thrust-bar $r^{15}$, is such that the circuit connection, for all the circuits from the source wire $t$ will be open between $t'$ and $t^2$, whenever the thrust-pins $t^3$ are entering or being withdrawn from the mercury cells $t^4$. This prevents sparking at the said cells and the evaporation of the mercury. It will be seen, from the description of the circuit connections and their actions, now fully given, that, for character type, the groups of row selecting magnets $f^{27}$, for the matrix block, and the corresponding mold plunger magnets $d^{27}$, are connected up in series on common branches of the working circuit; and that, for quads, or word spaces, the especial connections $t^{14}$, $t^{15}$, from the justifier combination blocks $p'$ $p^2$, are brought into action, through the operation of the escapement branch of the working circuit.

(b) With respect to the timing of the cams, &c: The action of these parts will be briefly traced, with respect to the position of the matrix block and other parts, as shown in Figs. 2, 4 and 5; which is not the idle or initial position of the parts, with respect to the driving shaft $b$, for any given type, but is the position of the block and all the connected parts, for the ejection of the type, to be immediately followed by the act of tapping the same down into the delivery channel $d^4$ of the stationary mold section $d^3$.

First. From the point assumed in the said figures, the peripheral cam-channel $d^{13}$ on cam-wheel No. 3, will be the first or next to act through ejecting lever $g^{19}$, to throw the mold plunger $d$ inward and eject the type into the delivery channel $d^4$. Immediately thereafter, the tapping cam-surface $f^{44}$ on cam-wheel No. 3, will operate through the upper arm of cam-lever $f^{36}$, to throw down the clamping plunger $f^{34}$ and centering-pin $f^{35}$ to tap the matrix block and force down the type into the channel $d^4$, so that it will be held by the lock-rib $d^{31}$ against the strain from the banking rack $g'$ $g^2$. Spring $f^{45}$ immediately restores the plunger $f^{34}$ to its uppermost or normal position. Coincidently with the action of the tapping cam-surface $f^{44}$ on cam-wheel No. 3, the strip feeding cam-wheel No. 2 acts to pull down the thrust-bar $r^{15}$ against its retracting springs $r^{13}$, to bring the fixed feed needle $r^{20}$ into engagement with one of the feed holes $r^3$, and rendering the proper thrust-pins $t^3$ operative on any of the working holes of the strip which may be then in line therewith, to energize the proper magnets to do the work represented by said holes.

Second. The peripheral cam-channel $d^{13}$, and cam-wheel No. 3, operates, through the ejecting lever $d^{10}$ to throw outward the mold plunger $d$ far enough to clear the fixed mold section $d^3$. Coincidently therewith, the profile cam-surface $f^{20}$, on cam-wheel No. 1, permits the spring $f^4$ to position the matrix-block against the proper stops previously set for that purpose, and the eccentric cam-channel $d^{18}$, on cam-wheel No. 3, throws the shifting mold section $d^2$ into its casting position and, by the cam-surface $d^{28}$, on the shifting rod $d^{16}$, co-operating with the roller $d^{29}$, on the slide-plate $c^6$, throws up the said plate and clamps the casting nipple $c^4$ and contact-yoke $c^5$ against the under surface of the body mold. Just as this occurs, the peripheral cam-surface $f^{40}$ on cam-wheel No. 3, acting on the upper arm of the lever $f^{36}$, throws down the clamping plunger $f^{34}$, thereby depressing the centering pin $f^{33}$ into centering holes $f^4$ to center the matrix-block and clamp the same against the top of the type-body mold in its casting position. This clamping action, both from above and below, for securing matrix block and the casting nipple to the body mold, continues until after the cast is taken.

Third. The roller $c^{25}$ of cam-lever $c^{23}$ rides off the raised part of the peripheral cam-surface $c^{25}$, on cam-wheel No. 1, permitting the pump spring $c^{32}$ to actuate the pump-plunger and effect the cast. If any cast was required, the actuating parts for the pump had been previously released from their locked position, by the energizing of the pump magnet $c^{28}$, when the thrust-pins were drawn down to close the working circuit by cam-wheel No. 2, as before noted.

Fourth. This same cam-surface $c^{25}$, on cam-wheel No. 1, immediately restores the pump actuating parts to their uppermost or idle position where they will be locked, as the working circuit will be open at $t'$ $t^2$; and coincidently therewith, cam-wheel No. 2 permits the thrust-bar $r^{15}$ and the thrust-pins $t$, to be thrown into their uppermost position, by the retracting springs $r^{13}$, thereby bringing the pivoted feed needle $r^{21}$ into action to feed the strip. Nearly simultaneously with this feed permitting movement of cam-wheel No. 2, the peripheral cam-surface $f^{40}$, on cam-wheel No. 3, comes into effect, through the lower arm of cam-lever $f^{36}$, to raise the clamping plunger $f^{34}$ into its uppermost position; and thereby, through the parts $f^{41}$ $f^{42}$, to lift the matrix-block away from the body-mold and cast type, and permitting the centering pin to assume its uppermost position. When the matrix-block is thus lifted, the type is held from following the block by the type nick rib $d^{30}$ in the mold section $d^2$.

Fifth. The profile cam-surface $f^{20}$ on cam-wheel No. 2 restores the matrix block to its initial position; and coincidently therewith, the eccentric cam-channel $d^{18}$ on cam-wheel No. 3 comes into action, thereby releasing slide-plate $c^6$, nipple $c^4$ and contact-yoke $c^5$ from their clamping position, and drawing over the shifting mold section $d^2$ into its ejecting position. The ejection of the type and the tapping of the same down into the delivery channel, follow next as above described in the first foregoing paragraph on the cam action.

*The principle of the justifier.*—The parts of the justifier have been specified, including the electric connections for the same; but the principle, on which the combination blocks $p'$ $p^2$ are set, so as to enable the proper electric connections to be made at word spaces, when the escapement branch of the working circuit is called into action, has not been fully stated. This will now be given. It will be recalled, that the possible word spacing or running width of quads, range from one to seven units; and that each of the combination blocks $p'$ $p^2$ has a corresponding series of seven insulated contacts $p$, with proper connections $t^{14}$ for controlling the corresponding mold plunger magnets $d^{27}$; and that the long continuous contact $p$, on the combination block $p'$ has a special wire $t^{15}$, tapping a two unit member of the wires $t^{14}$ to the two unit member of said mold plunger stop magnets. It must be further recalled, that the escapement rocker contact $p^{14}$ is limited to four escapement movements, before reaching its last or fifth step which brings it over the continuous or normal two unit contact, having the wire $t^{15}$ to the two unit mold stop magnet; and further, that three of the said escapement movements of the rocker $p^{14}$ occur over the block $p^2$ and one over the block $p'$. With these connections clearly in mind, the principle of the justifier may be readily grasped, by considering concrete examples.

The line of composition represented on the controlling strip $r$, as shown in Fig. 1, requires ten extra units of space to be distributed, in order to justify the line of type. The combination blocks $p'$ $p^2$ are therefore set for the five unit member of the contacts $p$, on the block $p^2$, and for the three unit member of the contacts $p$, on the block $p'$. Hence, three units extra, will be distributed to the first three word spaces, counting from the end of the line, and one unit extra to the fourth word space from the end of the line; or otherwise stated, the extras will be distributed, 3, 3, 3, 1. In other words, the word spacing or quad types, for the line represented on the strip, would be, in running width, counting from the last word space of the line, expressed in units, 5, 5, 5, 3, 2.

The possible range of justification, by way of addition, or "extras" is twenty units; and the range, by way of subtraction or "intras," for hair-spacing, is four units and this distribution of "extras" or "intras," on the machine as shown, is always made among the rearmost four word spaces, inasmuch as only the four escapement movements of the rocker $p^{14}$ are provided, before it reaches its right-hand limit or normal contact strip. Suppose, it had been necessary, for justification, to subtract four units, or hair space four word spaces. In that event, the combination blocks $p'$ $p^2$ would have been so set that their foremost or one unit contacts $p$ would have been in line with each other; and, throughout the four escapement movements of the rocker $p^{14}$, the circuit connections would have been closed through the one unit mold stop magnet. If it had been necessary to hair space only three word spaces, the second or two unit member of the contacts $p$ on the block $p'$ would have been set in line with the foremost or one unit member of the contacts $p$ on the block $p^2$; and hence, for the first three of the escapement movements of the rocker $p^{14}$, the circuit would have been closed through the one unit mold magnet, and, on the fourth escapement, the circuit would have been closed through the two unit member of the mold magnet. Suppose again, that the maximum possible of twenty units extra must be distributed. In that event, both the combination blocks $p'$ $p^2$ will have been set in their extreme forward position, thereby bringing the rearmost or seven unit members of their contacts $p$ into line with each other. Hence, during four escapement movements of the rocker $p^{14}$, the circuit will be closed through the seven unit mold magnet, thereby distributing five units extra to each of the rearmost four word spaces; and on the fifth escapement and all others for the given line, the rocker $p^{14}$ will make contact on the continuous or normal two unit member of the contacts $p$ on the block $p'$. Similarly, nineteen units extra would be distributed, 5, 5, 5, 4. Eighteen units extra would be distributed, 5, 5, 5, 3. Fifteen units extra would be distributed, 4, 4, 4, 3. Seven units extra would be distributed 2, 2, 2, 1, and so on. If asked why fifteen units extra are distributed 4, 4, 4, 3, instead of 5, 5, 5, the answer is that the electric connections are arbitrarily arranged to effect the most even available distribution, in integral units, of all possible "extras," among four word spaces. In other words, the connections are arranged arbitrarily for the distribution stated. Distribution by way of subtraction or hair spacing is, of course, limited to four units of "intras," for the reason that there are only four escapement movements provided for the rocker $p^{14}$, before reaching normal contact.

From the foregoing statements and illustrative examples, it must be obvious, that the principle involved is, that, of arbitrary distribution in integral units, either even or uneven, as may be required, among an arbitrary predetermined number of word-spaces. As the escapement mechanism is constructed, these are the first four word spaces from the end of the line; but might be more or less, by simply changing the number of escapements, provided for the rocker $p^{14}$ before reaching normal contact. If the line of composition has more than five words, or four word spaces, as will frequently happen, all word spaces or quads after the fourth from the end of the line will be two unit spaces or quads. It will be seen, that, with the exception of limitation to an arbitrarily fixed number of word spaces, my justification is identical with that used in hand set type.

To make the foregoing statements, regarding the justifier complete, it should be added that the double function served by the thrust-pins $t^3$, made possible by means of the two-way switch and the corresponding working and setting circuit connections, enable the justification holes $r'$ of the strip to be made, on the composing machine, by the same connections from the keys which serve to make the character holes on the said strip.

*Modifications of the justifier.*—Mechanism, for justification on the principle above stated, may take many different forms. For the purpose, therefore, of better illustrating the scope of this feature of my invention, I have shown three modifications of the justifier.

In the modification illustrated in Figs. 36 to 39 inclusive, a fixed branch lead contact board $w$, of insulating material, with a single series of mercury contact cells $w'$ is employed; and the main lead contact $w^2$ is mounted for a traveling movement lengthwise of the series of branch lead contacts $w'$, and is interceptible in succession by any one of two series of spring-seated, toothed stops $w^3$ $w^4$, held by a pair of escapement pallets $w^5$, and adapted to be lowered thereby into normal position, the stops $w^3$ by three steps, and the stops $w^4$ by four steps, or escapement actions of the said pallets $w^5$. The stops $w^3$ $w^4$ are mounted in a stop frame $w^6$, secured to the right end of bed-plate $w^7$. The pallets $w^5$ are subject to independent springs $w^8$, for independent movement in one direction, and to a common electro magnet $w^9$ for a common movement in the other direction. The stops $w^3$ $w^4$ would be set by two series of magnets corresponding to the magnets $p^3$, shown in the principal views. The independent springs $w^8$ permit the escapement pallets $w^5$ to move independently, as required to permit this setting of the stops $w^3$ $w^4$. The mercury cell contact board $w$ is supported by standard $w^{11}$, arising from the left end of the bed-plate $w^7$. The main lead contact $w^2$ is in the form of an armature lever pivoted to the upright portion of an angular block $w^{12}$, which is mounted for sliding movement in a groove $w^{13}$ of the bed-plate $w^7$, between the standard $w^{11}$ and the stop frame $w^6$. The armature lever $w^2$ is subject to a magnet $w^{14}$ and a retracting spring $w^{15}$, both carried by the block $w^{12}$. The said block $w^{12}$ is connected by impelling spring $w^{16}$ with the right end of the bed-plate $w^7$; and hence, when the said block is moved toward the left into an initial position, it will be set under tension from the spring $w^{16}$ to move toward the right. The upright portion of the block $w^{12}$ has a horizontal arm $w^{17}$, extending opposite to the armature lever $w^2$, and is provided with an expanded head, for engagement with the set members of the stops $w^3 w^4$ to intercept the block $w^{12}$ and the contact $w^2$ in the positions required. The block $w^{12}$ and parts carried thereby, would be thrown toward the left into their initial position by a setting lever not shown corresponding to the lever $p^{11}$, shown in the principal views. The right hand member of the series of contact cells $w'$ is connected to the two unit member of the mold magnets $d^{27}$. The next cell, toward the left, to the one unit member of said mold magnets; the third to the three unit mold magnet; and so on throughout the series up to the seven unit cell, at the extreme left; or otherwise stated, the wiring from contact board $w$ would be exactly similar to that from the combination contact block $p'$, the right end cell, corresponding to the long continuous contact piece $p$ on said block. Of course, the said right hand or normal member of the contact cells $w'$ and the third cell, from the right, might connect with the corresponding two unit mold magnet, $d^{27}$ by a common wire. The magnets $w^9$ and $w^{14}$ would be both connected up, by wire $w^{18}$, in series, on the escapement branch $t^{12}$ of the working circuit.

Looking now to the action, suppose the parts to be set, as shown in Figs. 36 and 37, the set stops being shown, in Fig. 36, as stated. The main lead contact $w^2$ would, then, stand over the three unit member of the mercury contacts $w'$. Hence, for the first three word spaces, circuit connections will be established through the three unit member of the mold magnets $d^{27}$, throwing in one unit extra at each of three word spaces. On the third escapement movement, the set member of the stops $w^3$ will be lowered to its normal position, thereby permitting the block $w^{12}$ to move toward the right, under the tension of its spring $w^{16}$, until intercepted by the set member of the stops $w^4$; which as shown, is the next member of said stops $w^4$, and will intercept the block in position to cause the main lead contact $w^2$ to stand directly over the two unit member of the mercury cells $w'$. Hence, at the next space, the circuit will be closed through the two unit branch lead and the two unit mold magnet $d^{27}$, thereby giving the normal spacing. This fourth escapement action will lower the set member of the stops $w^4$ to its normal position, thereby permitting the block $w^{12}$ to move toward the right to its limit against the fixed stop $w^{19}$. This will bring the main lead contact $w^2$ over the right hand or normal member of the mercury contacts $w'$. Hence, at all subsequent word spaces, the circuit connection will be established through the two unit or normal branch lead and the two unit or normal member of the mold magnets $d^{27}$. Otherwise stated, in the case assumed, there would have been distributed three units extra.

The combinations on the justifier, for which the electrical connections are arranged, are such that the set member of the stops $w^4$ will always be in advance, toward the right, of the set member of the stops $w^3$. It is therefore obvious, that the block $w^{12}$ with its main lead contact $w^2$, may be set to close the circuit connections over any of the branch leads $w'$, for three escapement actions, and then be again intercepted over any other branch lead required, of a lower order, for one escapement action; and thereafter, the parts will assume position to close the normal circuit connections, as in the principal views. This form of the justifier has the advantage of affording fixed mercury cell contacts.

In the modification shown in Fig. 40, the two series of stops $y$, corresponding to the stops $p^6$ in the principal views, are made to intercept a pair of main lead contacts $y' y^2$, to properly position the same over the proper members of a single series of branch lead contacts $y^3$ on a fixed contact board $y^4$. The said contacts $y' y^2$, may be thrown into initial position, by the lever $p^{11}$, as in the principal views, to set the same under tension from springs $y^5$, to move against the set members of the stops $y$. The contact $y'$ is connected by wire $y^6$ with a fixed contact $y^7$; and the contact $y^2$ is connected by wire $y^8$ with another fixed contact $y^9$. Both of the contacts $y^7$ and $y^9$ are mounted on a common and fixed block $y^{10}$ of insulating material, which has a third contact $y^{11}$ with wire $y^{12}$, running direct to the two unit or normal spacing member of the mold magnets $d^{27}$. The fixed contact $y^7$ is three times as long as the fixed contact $y^9$. An escapement controlled, main lead traveling contact $y^{13}$ is mounted in bearings $y^{14}$ and may be set, by the lever $p^{11}$, under tension, from spring $y^{15}$, to move toward the right. A pawl carrying armature lever $y^{16}$ is subject to an electro magnet $y^{17}$, on the escapement branch $t^{12}$ of the working circuit, for movement in one direction and to a spring (not shown) for movement in the other. At its free end, the armature $y^{17}$ carries a pair of ordinary escapement pawls $y^{18}$, which engage with teeth $y^{19}$, on the traveling contact $y^{13}$, to control the traveling movement of the same, step by step, at word spaces. The return branch wire $y^{20}$ from the magnet $y^{17}$ connects with the sliding traveling contact $y^{13}$ and serves as the main lead wire of the justifier. The escapement teeth $y^{19}$ on the traveling contact $y^{13}$, permit the said contact to travel from its extreme left hand or initial position to its extreme right hand or normal position, by five steps. The first three of these steps take place over the fixed contact $y^7$ and the fourth over the fixed contact $y^9$. Hence, when the justifier is set, the circuit connections to the mold magnets $d^{27}$ will be closed, for the first three word spaces, through the fixed contact $y^7$, the contact $y'$ and the particular member of the branch lead contacts $y^3$, over which the part $y'$ may have been set. At the fourth word space, or fourth escapement movement, the circuit will be closed over the fixed contact $y^9$, the part $y^2$ and the particular member of the branch contacts $y^3$ over which $y^2$ may be set. At the fifth word space, or fifth escapement movement, and at all subsequent word space actions, the traveling member $y^{13}$ will make contact with the fixed contact $y^{11}$ with wire $y^{12}$ leading to the normal or two unit member of the mold magnets $d^{27}$. It is obvious that with this construction, shown in Fig. 40, justification, precisely similar to that obtained by the parts shown in the principal views, may be secured. The contacts $y'$ $y^2$, may be set in any position by the two series of stops $y$, to establish the proper combination of branch lead contacts $y^3$, for co-operation with the traveling contact $y^{13}$. The advantage of this construction, over that shown in the principal views, is, that sliding contacts are everywhere made. The parts $y'$ and $y^2$, having once been set, are never disturbed and bear tightly on the respective branch lead contacts $y^3$ over which they may be placed. Likewise, the traveling contact $y^{13}$ bears tightly on the fixed contacts $y^7$ $y^9$ and $y^{11}$ and, under its traveling action, makes a scraping contact therewith.

In the modification shown in Fig. 41, the traveling contact $z$ with its magnet $z'$, &c., may correspond exactly to the rocker $p^{14}$ and magnet $p^{24}$, as shown in the principal views, and receive its traveling motion by exactly the same mechanism as that applied to the rocker $p^{14}$; but instead of moving over the set members of a divided branch lead contact board, consisting of the combination contact blocks $p'$ $p^2$, the traveling contact $z$ moves over one of a series of contacts $z^2$ carried by a single contact-board $z^3$ having a multiple series of said branch lead contacts $z^2$ each corresponding in number to the number of escapement movements provided for the traveling contact before reaching its normal position. The connections from the members of the contacts $z^2$, which lead to the mold magnets $d^{27}$ are arbitrarily arranged, to give the justification required. In other words, there will be as many of the series of contacts $z^2$, crosswise of the contact board $z^3$, as there are different amounts of justification to be provided for. For instance, on the board $z^3$, a shown, there are twenty series of the contacts $z^2$, arranged to distribute from one to fifteen units extra, and from one to four units intra, and to give the normal spacing of two units. The block $z^3$ may be set under tension, from a spring $z^4$, to move under and lengthwise of the traveling contact $z$, and may be intercepted by any one of twenty stops $z^5$, to throw the proper series of branch contacts into position, for co-operation with the traveling contact $z$. For example, as the parts are shown in Fig. 41, the justifier is set to distribute three units extra. The amount of justification for which any of the series $z^2$ are arranged, is indicated on the marginal piece $z^6$ opposite the corresponding series. Each member of each series of contacts $z^2$ is marked to denote the units of spacing to which it corresponds. The stops $z^5$ would be set by corresponding magnets, not shown, and suitable circuit connections for the same. This form of the justifier has this advantage, to-wit: the electrical connections therefrom may be arranged, to give any desired relative distribution whatever of the "extras" or "intras" among four word spaces. With the other forms of the justifier, the first three word spaces from the end of the line, necessarily receive an equal and the largest amount of the distribution, which might make the right hand part of a column of print somewhat lighter than the left hand portion, of the same. With the construction shown in Fig. 41, the spacing may be balanced up, so that all parts of the column will look substantially alike. This form of the justifier would give a distribution well adapted for fine book work.

Upon analysis of the mechanism involved in the several forms of the justifier, so far considered, it is, of course, obvious that it is a device for controlling variable spacing devices for the justification of print or printing surfaces. In the machine shown, these variable spacing devices happen to be the stops $d^{23}$ and their magnets $d^{27}$ for positioning the mold plunger $d$ to give the proper sized quads for justifying a line of type; but or course, they might equally well be applied to justify impressions from male dies to produce justified lines of matrices in a suitable matrix material or of print on paper or other suitable surface. For example, it must be obvious that this justifying mechanism would be capable of use in connection with a variable feed typewriting machine, the general movements of which might be under the control of a punctured representative strip, such as is employed in this machine; and thereby, there would be produced a justified print from the typewriting machine.

It should be equally clear that the justifier, in all its forms, serves to throw one or more branch operating connections into operative relation with one or more main operating connections, at word spaces, to control said variable spacing devices as required to effect the justification. These connections, as shown, are electric for conducting electricity, as the preferred motive force to the motor elements (in the form of magnets $d^{27}$) of the spacing devices, but it is, of course, obvious that the said motor elements might be fluid motors and the connections be fluid conductors instead of electric conductors, as shown. Again, the spacing devices and the operating connections for the same, might be purely mechanical, and the justifier, nevertheless, be made to throw the proper branches into operative relation with the proper main connection to control the spacing as required for justification. In other words, in a broad point of view, the principle of construction involved in the justifier might be regarded as that of a switch for mechanical, fluid pressure or electric connections to variable spacing mechanism employed in the production of justified print or printing surfaces.

As already several times noted, the particular variable spacing mechanism herein shown, comprises the type-body mold with its plunger $d$ under tension, and the series of stops $d^{23}$ with their operating magnets $d^{27}$, for variably positioning said plunger, in order to co-operate with the matrix-block, to give the different running widths of type and quads; but, it must be obvious, to any person skilled in this art, that, having regard to the result in respect to the spacing in the line, the said parts $d$ $d^{23}$ and $d^{27}$ correspond exactly in function to the variable feed devices used for the impression material of matrix making and type writing machines. The justifier herein described, could be applied to control said variable feed mechanisms of a matrix machine or a typewriter, equally as well as to control the said variable mold mechanism herein shown and described. As herein shown, the variation of the mold mechanism, which is effected under the control of the justifier, takes place at the word spaces, so as to produce quads of different running width, as required; and, on the matrix making or type-writing machine, the justifier could be applied in the same way to the impression material feed, so as to vary the same, at word spaces, as required, in order to justify the line. The justifier herein described, could also be applied to control the releasing mechanism of a type setting machine, so as to select quads of different sizes, as required to justify the line of type.

The terms "variable spacing devices" and "variable word spacing devices," as employed in the claims of this case, are used in a generic sense, intended to include all the above noted spacing mechanisms and all other spacing mechanisms, which could be controlled by the justifier herein shown and described, for the justification of print or printing surfaces; and the distinction between the two expressions lies in the fact that the expression "variable word spacing devices" is more limited than the other, the same being intended to distinguish the cases, wherein the variation for justification is applied entirely to the spacing between the words of the line.

Having regard to the combined type casting and setting machine herein shown and described, for producing justified lines of type, it may be noted that the drawings were all prepared from a full sized working machine, and that all statements of fact herein contained are based upon that working machine as applied in practical use. With this working machine, I have been able to turn out an average of about one hundred and eighty type per minute.

I calculate that, at most, five of these casting and setting machines—possibly four—will be able to keep up with two of the composing machines shown in my companion case, due allowance being made for the gain of constant action on this machine against the natural delays of the composer on the composing machine.

One man may, take care and operate a large number of the type casting and type setting machines; and the two companion machines may, of course, be widely separated in location or time of use.

In addition to the several modifications hereinbefore noted, it will be understood, of course, that many other modifications might be made in the mechanisms herein shown and described, and especially in the details of the construction, without departing from the spirit of my invention. For example, having regard to the thrust pins $t^3$ and the mercury contacts $t^4$, between which the strip $r$ is fed, it is obvious that, instead of insulating the mercury cells $t^4$ and connecting the same with the wires $t^5$, the thrust-pins $t^3$ might be insulated and be connected with the wires $t^5$ and that the mercury, for co-operating therewith might be held in a continuous metallic trough capable of being charged from the bed of the machine. Again, having regard to the line delivery mechanism, the abutment plunger $g'$ $g^2$, the delivery rack $g^t$ $g^9$ with the pinions, springs, &c., for operating the same, might be all dispensed with, by simply cutting away a large part of the fixed section $d^3$ of the mold, and locating the galley in position to receive the type directly from the mold under the ejecting action of the mold plunger $d$.

I have also used an electrically operated switch instead of the mechanically operated two-way switch $s$ $s'$ herein shown and described, but I found that the electric switch would not do as satisfactory work.

It should also be noted, that the terms "integral font matrix block," are used in a sense broad enough to cover and include any plate having the complete font of matrices on its face and rigid therewith. For example, if several font sections or electro matrix strips were joined on the face of a common plate and rigidly secured thereto, the matrix plate or block thus obtained would be within the scope of my invention in the broad point of view, although such a block would not be so true or capable of as good work as the single electro matrix plate produced as an entirety from a form containing a complete font of type as hereinbefore describe.

It should equally well be understood, that if the complete font of matrices were cut in the face of a single plate or several plates rendered rigid with each other, that the plate or block thus produced would come within the scope of my invention and the terms "integral font matrix block," as herein broadly used.

It is, of course, obvious, that if instead of setting up a complete font of type into a form and taking the electro-matrix plate therefrom, as hereinbefore described, that the said font of type might be cut or otherwise formed in the desired arrangement, on a common back plate or body, and the electro matrix be taken from that, although this, again, would not give so good a matrix plate or block.

None of these modifications in the construction of the matrix block are the full mechanical equivalents of the matrix block in its preferred form, made as an electro matrix for the whole font, as an entirety from a font of type, as hitherto fully described, because they would not be capable of doing equally good work; but these modifications have been noted simply to better disclose the scope of my invention, in respect to this feature, with a view of forestalling and shutting off any mere colorable evasions or changes which might be rung on the same.

What I claim, and desire to secure by Letters Patent of the United States, is as follows:

1. In a machine for casting type, the combination with a type-body mold, of a plate having on its face and rigid therewith a font of matrices, arranged in rows in two directions, for the alignment of any matrix with the throat of said mold by a two-way movement of said block, substantially as described.

2. In a machine for casting type, the combination with a variable type-body mold, of a matrix-block having a matrix-plate containing a complete font of matrices, rigid with said plate and arranged in rows in two directions for alignment of any matrix, with the throat of said type-body mold, by a two-way movement of the said block, substantially as described.

3. In a type-casting machine, the combination with a type-body mold, of a matrix-plate containing a complete font of matrices rigid with said plate, which matrices are separated from each other and are justified into corresponding positions of uniform sized spaces on said plate, by intervening walls of the said plate, which walls are of uniform width bodywise and of varying widths runningwise of the matrices or type, whereby the said plate may be brought to the casting position by uniform steps of movement, substantially as described.

4. The method of producing an integral font matrix plate, for use on a type-casting machine, which consists in setting up into a form a complete font of printers' type in the desired arrangement, and then immersing the said form itself in an electro-plating bath to obtain therefrom an electro-matrix plate by the electro depositing process, substantially as described.

5. The method of producing an integral font matrix plate, for use on a type-casting machine, which consists in setting up into a form a complete font of printers' type in the desired arrangement, then immersing the said form itself in an electro-plating bath to form thereon an electro-matrix plate, by the electro depositing process, and finally in separating the plate from the form, by picking the type therefrom, separately, substantially as and for the purposes set forth.

6. The method of producing the integral font matrix block, herein described, for use on type-casting machines, which consists first, in setting up into a form a complete font of printers' type, second, in separating and justifying the said type into corresponding positions of uniform sized spaces runningwise, by truncated or faceless type ground down below type-body height, and in separating and justifying the said type bodywise by rules also ground down below type-body height, third, in producing from said form an electro matrix plate by the electro depositing process, in which step the type are picked from the plate, separately; and finally, backing the said electro matrix plate with metal suitable for body, substantially as described.

7. In a type-casting machine, the combination with a type-body mold, of the two-way movable matrix-block, containing the complete font of matrices, arranged in rows in two directions, for selection by the two-way movement of the block, and arranged also in rows in one direction, with reference to the running width of face, and with all the said matrices justified into corresponding positions of uniform sized spaces on said block by intervening walls of uniform width bodywise and of varying width runningwise of the said matrices, all substantially as and for the purpose set forth.

8. In a type casting machine, the combination with a type-body mold, of the two-way movable integral font matrix block, provided with centering surfaces, and a centering plunger movable transversely to the plane of the block's movement and engageable with said centering surfaces of the block to accurately center the matrices in casting position.

9. In a type casting machine, the combination with the type-body mold, of the integral font, two-way movable matrix block, having the matrices on its face and the centering holes on its back, the transversely movable centering and clamping pin, and a pressure applying device applicable to said pin and cooperating therewith, to center the matrix block and clamp the same to the type-body mold in casting position, substantially as described.

10. In a type-casting machine, the combination with the type-body mold, having a type nick rib, of the integral font two-way movable matrix block, having the matrices on its face and the centering surfaces on its back, the centering pin engageable with said surfaces, and a combined clamping and lifting device, for operating said pin to center the block and clamp the same in casting position, and for lifting the block away from the type after the cast, substantially as and for the purpose set forth.

11. The combination with a carriage, of a font of dies movable with and crosswise of said carriage, for the selection of the dies, and a bell crank lever having its elbow pivoted to said carriage and one of its arms connected to said font of dies, whereby both movements may be imparted to said font by a thrusting movement imparted to the other arm of said bell crank, substantially as described.

12. The combination with the matrix block carriage, of the integral font matrix block transversely movable thereon, having its matrices arranged in rows in two directions, for selection by the two-way movement of the block, and the bell-crank lever having its elbow pivoted to said carriage and one arm pivotally connected to said block, whereby both movements may be imparted to said block by a thrusting movement imparted to the other arm of said bell crank lever, substantially as described.

13. The combination with a carriage and guide-ways for the same, of a font of dies movable with and crosswise of said carriage, for the selection of the dies, a bell-crank lever having its elbow pivoted to said carriage and one of its arms connected to said font of dies, an impelling spring and a cam-wheel with a two-way cam-surface operative on said lever, to effect the movements of said font of dies and restrict the spring to a timed action, substantially as described.

14. The combination with a matrix block carriage, of an integral font matrix block mounted on and movable crosswise of said carriage and having its matrices arranged in rows in two directions, for selection by said two way movement of the block, a bell crank lever having its elbow pivoted to said carriage with one of its arms connected to said block, an impelling spring and a cam-wheel with a two-way cam surface operative on the other arm of said bell crank to effect both movements of said block and restrict the spring to a timed action, substantially as described.

15. The combination with the matrix block, carriage and guide frame, as described, of the bell crank $f^9$, link $f^{11}$, lever $f^{12}$, spring $f^{14}$, lever $f^{16}$ and cam-wheel with cam-surface $f^{20}$, all arranged and operating as described.

16. In a type casting machine, the combination with a type-body mold having a throat plunger under tension to assume an extreme position, of a series of stops for variably intercepting the plunger to fix the mold throat for the different running widths of type body, substantially as described.

17. In a type casting machine, the combination with a type-body mold having a throat plunger under tension, to assume an extreme position, of a series of stops for variably intercepting said mold plunger, magnets for operating said stops and electric connections for said magnets, substantially as described.

18. In a type casting machine, the combination with the type-body mold having the throat plunger under tension, of the two-way movable matrix block, under tension and having its matrices arranged as described, and three sets of intercepting stops for positioning said parts, two sets of which cooperate to intercept the block for the selection of the matrix and the third set of which intercept said plunger to fix the running width of the mold throat, substantially as described.

19. The combination with the type-body mold, having the throat plunger under tension, of the two-way movable matrix block, under tension, having the matrices arranged in rows in two directions and also grouped into rows in one direction, according to running width of face, of the three sets of intercepting stops, two for positioning the matrix block, and the third for positioning the mold plunger, and common connections for controlling the row selecting members of the matrix stops, and the corresponding mold stops, substantially as described.

20. In a type casting machine, the combination with a variable type-body mold, of a two-way movable font of matrices arranged in rows in two directions, and also arranged in rows in one direction, according to running width of face, two sets of electric devices for intercepting said block to select a matrix, and electric devices for varying said mold, connected up in series with the electric devices controlling the row selecting movements of said font, substantially as described.

21. In a type casting machine, the combination with the type-body mold, having its throat plunger under tension, as described, of the two-way movable integral font matrix block with its matrices arranged into rows in two directions and grouped according to running width of face, the two sets of stops for positioning the matrix block, the set of stops for positioning the mold plunger, the representative controlling strip, magnets for operating said stops, and circuit connections for the same, including thrust pins cooperating with said representative strip, substantially as described.

22. In a type casting machine, the combination with the relatively fixed type-body mold section, of the shifting type-body mold section, having the throat-channel fitted with the plunger, under tension to assume its outermost position, stops for variably intercepting said plunger, and cooperating mold shifting and plunger thrusting devices, substantially as described.

23. In a type casting machine, the combination with a type-body mold, of a casting pot and a casting nipple movable independently of the casting pot, for registration with the mold throat, at the time of the cast, and separation therefrom immediately after the cast is made, substantially as described.

24. In a type casting machine, the combination with the type-body mold, of the casting nipple movable independently of the casting pot, normally under strain to move away from the mold, and cam-controlled devices for moving said nipple into registration with said mold-throat, at the time of the cast, and for releasing the same, to permit the nipple to move away from the mold immediately after the cast is taken, substantially as described.

25. The combination with the shifting section of the type-body mold of the movable casting nipple and the mold shifting devices provided with means for clamping said nipple against the mouth of the mold when the mold is thrown to casting position, substantially as described.

26. In a type casting machine, the combination with the type-body mold, of the integral font matrix-block, having the matrices and the centering surfaces arranged as described, the centering pin engageable with said surface to center the block and clamp the same against the face of the mold, the casting nipple movable against the back of the mold, and pressure applying devices cooperating to clamp the said matrix block and said casting nipple to the mold, while the cast is being made, substantially as described.

27. In a type casting machine, the type-body mold, comprising a relatively fixed section and a two-part shifting section embracing a throat plunger, means for loosely holding the two parts of said shifting section and said plunger together, at all times, except when in the casting position, and means for tightly clamping the same together and to the fixed mold section when in the casting position, substantially as described.

28. In a type casting machine, the combination with the fixed mold section, of the two-part shifting mold section embracing the mold throat plunger, a cross-bolt and spring-washer for loosely holding said shifting parts together, a shifting device and a resistance surface cooperating to clamp said shifting parts of the mold tightly together against a shoulder of the fixed mold section, when in casting position, substantially as described.

29. The combination with the relatively fixed mold section $d^3$ of the shifting mold section $d^2$, working between jaws or shoulders of said fixed section and provided with lateral guide studs $d^{14}$, working through said jaws, the pivoted shifting arms $d^{15}$, cam-rod $d^{16}$ and eccentric cam $d^{18}$, operating substantially as and for the purpose set forth.

30. The combination with the mold sections $d^2$ and $d^3$ of the mold plunger $d$ having the guide screws $d^8$ engaging the section $d^3$, stop devices for intercepting said plunger, and springs $d^7$ on said screws $d^8$ and between the plunger head and the mold section $d^2$ and cooperating with said stop devices both to position the plunger and clamp the mold sections $d^2$ and $d^3$, together endwise, when in casting position, substantially as described.

31. The combination with the type-body mold, of the tube nipple $c^4$, the sliding keeper plate $c^6$ for the same, having the cam-roller $d^{29}$, and the shifting rod $d^{16}$ having the cam surface $d^{28}$ cooperating with said roller to clamp said nipple to the body mold, when the cast is being made, substantially as described.

32. The combination with the type-body mold and the matrix block having the centering surfaces $f^4$, of the yoke $f^{15}$ having the centering pin $f^{33}$, and the plunger $f^{34}$, for applying pressure to said pin, substantially as described.

33. The combination of the movable matrix-block having the centering surfaces, the centering pin engageable with said surfaces to center the said block in casting position, the movable plunger, for applying pressure to said pin provided with a passage through which works the head of said pin and provided with a stiff spring, for applying the pressure from the plunger to said pin, with freedom for a yielding action, when necessary, substantially as described.

34. The combination with the matrix-block, having the centering holes, of the centering pin $f^{33}$, cooperating therewith, to center the said block in casting position, the cam actuated plunger $f^{34}$, through which the head of said pin works, and the stiff spring $f^{43}$ carried by said plunger and bearing against the head of said pin, substantially as and for the purposes set forth.

35. The combination with the matrix-block and its carriage, of the pivoted guide-frame for said carriage, provided with the yoke $f^{15}$, the centering pin $f^{33}$ and the swiveled plunger $f^{34}$, substantially as and for the purposes set forth.

36. The combination with the matrix-block, its carriage and guide-ways, of the yoke $f^{15}$ having the catch-lug $f^{42}$ and the plunger $f^{34}$ having the projection $f^{41}$, for cooperation with said lug, to lift the matrix-block away from the cast type, substantially as described.

37. In a type casting machine, the combination with the matrix-block and its carriage, of a pivoted guide-frame, on which said carriage is mounted for sliding movement, a centering pin mounted on said frame and a swiveled plunger adapted for cooperation with said pin in one position, and to be turned to one side, for permitting the said frame, together with the parts carried thereby to be thrown back on its pivotal bearings, substantially as described.

38. In a type casting machine, the combination with the casting nipple, of the pivoted type-body mold and the pivoted frame supporting the matrix block carriage, substantially as and for the purposes described.

39. The combination with the pivoted mold, of the pivoted frame carrying the matrix block carriage and centering pin, and the swiveled plunger cooperating with said parts and adapted to be thrown to one side to afford clearance for the same in their pivotal movements, substantially as described.

40. The combination with the rod $c^{21}$ and the pillow block $a^3$, having the projecting lugs $a^{34}$, of the type body mold and the guide frame for the matrix block carriage pivoted to said rod at one end and having their other or free ends supported and held, from lateral displacement, when in working position, by said pillow block and lugs, substantially as described.

41. In a type casting machine, the combination with a driving shaft with cams, located at one end of the machine, of a melting pot and pump, located at the other end of the machine, a type-body mold, a matrix-block and a carriage for said block located intermediate said driving shaft and said melting pot, and an electrically heated tube, extending from said melting pot to said mold, substantially as described.

42. In a type casting machine, the combination with a driving shaft with cams, located at one end of the machine, of a melting pot and pump located at the other end of the machine, a rocker rod $c^{21}$ extending between said driving shaft and melting pot, for operating said pump under the control of one of the cams on said shaft, the type-body mold and the matrix block carriage frame pivoted to said rocker rod, intermediate said melting pot and driving shaft, and the electrically heated tube extending from the melting pot to the mold, substantially as described.

43. The combination with variable spacing devices, of operating connections for the same, comprising main and branch members and a justifier adapted to be set to throw the proper branch or branches into operative relation with said main for justifying the line, substantially as described.

44. The combination with variable word spacing devices of operating connections for the same composed of main and branch members and a justifier adapted to be set to throw the proper branch or branches into operative relation with the main at word spaces, for justifying the line, substantially as described.

45. The combination with variable spacing devices, of motors for controlling the same, motive force conductors for said motors comprising main and branch members and a justifier adapted to be set to throw the proper branch or branches into operative relation with the proper main or mains, for justifying the line, substantially as described.

46. The combination with variable spacing devices, of motors for controlling the same, motive force conductors for said motors comprising main and branch members and an automatic justifier adapted to be set to throw the proper branch or branches into operative relation with the proper main or mains, for justifying the line, substantially as described.

47. The combination with variable word spacing devices, of motors for controlling the same, motive force conductors for said motors, comprising main and branch members and a justifier adapted to be automatically set to throw the proper branch or branches into operative relation with the proper main or mains to supply the proper motors for controlling said word spacing devices to justify the line.

48. The combination with electrically controlled spacing devices, of circuit connections for the same composed of one or more main leads and a series of branch leads corresponding to the varieties of spacing, and a justifier adapted to be set to throw the proper branch leads into operative relation with the proper main leads, for rendering available the proper circuit connections to control the spacing devices so as to justify the line, substantially as described.

49. The combination with electrically controlled word spacing devices, of circuit connections for the same, comprising one or more main leads and a series of branch leads corresponding to the varieties of word spacing, and a justifier adapted to be set to throw the proper branch lead or leads into operative relation with the proper main or main leads to energize the proper electric devices for controlling said word spacing devices to justify the line, substantially as described.

50. The combination with electrically controlled word spacing devices, of circuit connections for the same, composed of one or more main leads and one or more series of branch leads corresponding to the varieties of word spacing, and a justifier adapted to be set to throw the proper branch lead or leads into operative relation with the proper main lead or leads and having one element which travels for establishing the circuit connections through the set leads, at word spaces, in the proper succession, substantially as described.

51. The combination with electrically controlled word spacing devices, and a justifier, for controlling the circuit connections to the same, comprising main lead contact or contacts, and a board with branch lead contacts corresponding to the varieties of word spacing, which parts are capable of being set relative to each other for the connections required and one of which parts has a traveling movement, with respect to the other, for establishing the proper circuit connections at word spaces, substantially as described.

52. The combination with electrically controlled variable word spacing devices, of a justifier for controlling the circuit connections to the same, having as elements thereof, one or more main lead contacts, a branch lead board with one or more series of branch leads corresponding to the varieties of word spacing, and an escapement, the said first named two elements being adapted to be set relative to each other for the connections required and one thereof having a traveling movement over the other, and said escapement element being applied to said traveling element, to establish the proper circuit connections at word spaces, substantially as described.

53. A justifier, for controlling variable spacing devices, comprising as elements, one or more main operating connections and a pair of combination blocks each having a series of branch connections corresponding to the varieties of spacing, which blocks are adapted to be set relative to each other to bring the proper branch connections into operative relation with the proper main connections, and one of which elements has a traveling movement over the other to establish the proper connections in the proper order, substantially as described.

54. The combination with electrically controlled word spacing devices, of a justifier for controlling the same, comprising a pair of combination contact blocks each with a series of branch lead contacts, corresponding to the different word spaces, capable of being set for any required combination of contacts, and a main lead contact having a traveling movement over the set contacts of said blocks, for establishing the proper circuit connections in the proper order, substantially as described.

55. The combination with the series of mold plunger stop magnets $d^{27}$, of the justifier comprising the combination contact blocks $p'\ p^2$, each with the series of branch lead contacts $p$ and capable of being set as described, the main lead traveling contact $p^{14}$, movable over said blocks and an escapement applied to said traveling contact to establish the set circuit connections at word spaces in the proper order, substantially as described.

56. The combination with the mold plunger stop magnets $d^{27}$, of the justifier combination contact blocks $p'\ p^2$, each with the series of contacts and capable of being set as described, the traveling contact $p^{14}$, a magnet controlled escapement, for operating said traveling contact, the representative controlling strip $r$ and the escapement branch of the working circuit, for energizing said escapement magnet, at word spaces, under the control of said strip, substantially as described.

57. The combination with the representative strip $r$, of the type body mold, the matrix block movable to its extreme limits in two directions, to bring its quad surface into casting position at word spaces, the combination blocks $p'\ p^2$ with the series of branch lead contacts $p$, and capable of being set as described, the main lead traveling contact $p^{14}$ the escapement and escapement magnet for said traveling contact, and circuit connections to said escapement magnet, under the control of said strip, for operating said escapement and traveling contact, substantially as described.

58. The combination with variable spacing devices, of main and branch operating connections for the same, a justifier for establishing the proper operative relation between said connections, comprising elements certain of which are movable to permit the said elements to be properly set relative to each other, and a series of stops for variably intercepting said movable element or elements to properly set the same, substantially as described.

59. The combination with variable spacing devices, of main and branch operating connections for the same, a justifier, for establishing the proper operative relation between said connections, comprising elements certain of which are movable to permit the justifier elements to be properly set relative to each other, means for throwing said movable element or elements into an extreme position and putting the same under strain or tension to move in the opposite direction, and a series of stops for variably intercepting said movable element or elements to properly set the same.

60. The combination with variable spacing devices, of main and branch operating connections for the same, a justifier for establishing the proper operative relation between said connections, comprising elements certain of which are movable and subject to springs, for permitting the justifier elements to be properly set relative to each other, a setting device for throwing said movable element or elements to initial position, a series of stops for variably intercepting said movable element or elements to properly set the same, and an escapement for rendering said set elements active at word spaces, substantially as described.

61. The combination with variable spacing devices, of main and branch operating connections for the same, a justifier, for establishing the proper operative relation between said connections, comprising elements certain of which are movable to permit the justifier elements to be properly set relative to each other, a series of magnet controlled stops for variably intercepting said movable element or elements to properly set the same, a representative controlling strip, and circuit connections for said stop magnets controlled by said strip to set said justifier, substantially as described.

62. The combination with the justifier combination contact members, requiring to be set relative to each other, for rendering available the proper combinations, of springs applied to such of the same as require to be intercepted, magnet controlled stops for intercepting said parts, to properly set the same, a power actuated device for throwing said parts to initial position and putting the same under tension from said springs, a magnet controlling said setting device, a representative strip containing setting holes and circuit connections for said magnets, controlled by said strip, for setting the justifier, substantially as described.

63. The combination with the justifier elements $p'$, $p^2$ and $p^{14}$, under tension, of the lever $p^{11}$, for throwing the same to initial positions, the driving shaft $b$ and connections therefrom for operating said lever, substantially as described.

64. The combination with mechanism, for the production of printing surfaces, of a representative strip and cooperating connections, for controlling said mechanism, including two or more branch sets of connections and a switch for throwing any one of said branch sets into operative relation with said strip, substantially as described.

65. The combination with mechanism, for the production of printing surfaces, of a representative strip and cooperating connections for controlling said mechanism including two or more branch-sets of connections, for controlling parts doing different kinds of work, and an automatic switch, also controlled by the strip, for throwing said branch sets of connections into action, in the proper order, substantially as described.

66. In an electrically controlled machine for the production of printing surfaces, the combination with a representative controlling strip, of circuit connections for cooperation therewith, including thrust pins and cooperating contacts between which the strip is fed, two or more branch sets of connections, for doing different kinds of work, and an automatic switch for throwing any one of said branch sets of connections into the same circuit with said thrust pins, whereby the same thrust pins and cooperating contacts may be made to serve for controlling different kinds of work, substantially as described.

67. The combination with the representative strip $r$, having the working circuit holes, setting circuit holes and trip circuit holes, as described, of the working circuit connections, setting circuit connections and trip circuit connections, for cooperation therewith, as described, and the two-way switch, controlled by said trip circuit to convert the working into the setting circuit, substantially as and for the purposes set forth.

68. The combination with the constantly running shaft, of the representative strip $r$, the working circuit connections, setting circuit connections and trip circuit connections, as described, the two-way switch and the clutch device, under the control of said strip and trip circuit, for operating said switch, to convert the working into the setting circuit, as described.

69. The combination with the representative controlling strip, of the two-way movable matrix-block, the type-body mold with its throat plunger under tension, the two sets of stops for positioning said matrix-block, the set of stops for positioning the mold plunger, magnets for operating said stops, a justifier comprising elements adapted to be set to render the proper connections to said mold magnets available, and a magnet controlled escapement, for rendering said connections active, at word spaces, and circuit connections for all of said magnets operative under the control of said strip, substantially as and for the purpose set forth.

70. In a type-casting and setting machine, the combination with the two-way movable matrix-block and a type-body mold having a throat plunger, under tension, of two sets of stops, for positioning said matrix-block, a set of stops for positioning said mold plunger, a justifier for controlling said mold plunger at word spaces, stops for setting said justifier, magnets for controlling all of the said sets of stops, a representative controlling strip having working holes and justifier setting holes, circuit connections for cooperation with said strip and magnets, including two sets of branches, one for the working and the other for the setting circuit, and a two-way switch, for converting the working into the setting circuit or vice versa, substantially as described, whereby the same thrust-pins and positions on the strip are made to answer for controlling both the working and the setting circuit, substantially as described.

71. The combination with the driving shaft and the clutch device, adapted to be thrown into and out of gear therewith, of the two-way switch $s\ s'$, and connections from said clutch device for shifting the movable member of said switch, substantially as described.

72. The combination with the strip $r$ of the mercury cells $t^4$, the bank of thrust pins $t^3$ between which the strip is fed, the feed needles $r^{20}$ and $r^{21}$, operating on said strip to hold and feed the same as described, and the thrust-bar $r^{15}$ for operating said bank of thrust pins and said feed needles, substantially as described.

73. The combination with the strip $r$, thrust pins $t^3$ mercury cells $t^4$, feed needles $r^{20}\ r^{21}$ and thrust-bar $r^{15}$, as described, of the strip unwinding and winding-up spools $r^4\ r^5$, the electric motors $r^{28}$ and $r^{29}$, for operating said spools, and circuit connections for said motors, controlled by the strip itself, substantially as described, to always maintain a slack section of the strip where operated upon by said thrust-pins and feed needles.

74. In a type-casting and type-setting machine, the combination with a type-body mold, having a delivery channel for the cast and ejected type, of an abutment plunger, under tension, and working in the said channel, for holding the said type on their feet, substantially as described.

75. In a type-casting and setting machine, the combination with a type-body mold, of a delivery channel, for receiving the ejected type, provided with a lock-rib in one of its walls, for engaging behind the ejected type, when tapped down in the channel, and an abutment plunger seated in said channel and under tension, to assume an innermost position, for holding the said type on their feet against the said lock-rib, substantially as described.

76. The combination with the mold section $d^3$ having the delivery channel $d^4$, provided with the lock-rib $d^{31}$, of the banking or abutment plunger $g'$ $g^2$, under tension in said channel, and operating substantially as and for the purpose set forth.

77. In a type-casting and setting machine, the combination with the type-body mold, of a delivery channel, for receiving the ejected type and a line delivery device, comprising a movable slide, seated in the side of said channel, and provided with a spring-catch at its inner end, which is normally clear from the type, and a fixed cam surface, for cooperation with said catch, when the slide is moved, to force the catch into engagement with the rear surface of the innermost type, substantially as and for the purpose set forth.

78. In a type-casting and type-setting machine, the combination with the type-body mold having a delivery channel, provided with a lock-rib of an abutment plunger seated in said channel and under tension, to assume an innermost position against the outermost type, for holding the type on their feet, and a line delivery device, comprising a slide working in a seat opening from the side of said channel, and provided on its inner end with a spring-catch which normally stands clear from the type, and a cam-surface in the wall of said channel, for cooperation with said catch, when the said slide is moved outward, to force the catch into engagement with the back surface of the innermost type, substantially as described.

79. The combination with the mold section $d^3$ having the delivery channel $d^4$ and cam surface $g^9$, of the delivery rack $g^7$ having the spring-catch $g^8$, under tension, and operating substantially as described.

80. The combination with the line delivery rack $g^7$, of the galley $k^{11}$ movable galley head $k^{12}$, and means for operating said rack and galley head to deliver the line of type into the galley, substantially as described.

81. The combination with the driving shaft $b$, of the clutch device adapted to be thrown into gear therewith, the line delivery rack $g^7$, the galley head $k^{12}$ and connections from said clutch for operating said line delivery rack and galley head to deliver the line of type, substantially as described.

82. The combination with the line delivery devices, of the clutch device for operating the same, the trip and trip magnet for throwing said clutch into gear with the driving shaft, the representative strip with trip-hole $r^2$ and the trip circuit to said magnet controlled by said strip, substantially as and for the purposes set forth.

83. A machine organized for casting and setting type, comprising a constantly running shaft, cams, &c., for the application of power, the variable type-body mold, the two-way movable matrix-block, the sets of stops and stop-magnets, for positioning the mold-plunger and matrix-block, the representative controlling strip, electric connections for said magnets, under the control of said strip, the melting pot located remote from said mold, and the electrically heated tube, for conducting the metal from said melting pot to said mold, substantially as described.

84. The machine organized for casting and setting type into justified lines, comprising a constantly running shaft, cams, &c., for the application of power, the variable type-body mold, the two-way movable matrix block, the justifier, the sets of stops and stop magnets, for positioning the mold plunger matrix block and the parts of said justifier, the escapement controlled contact and magnet, for rendering the justifier active at word spaces, the melting pot located remote from said mold, the electrically heated tube, for conducting the metal from said melting pot to said mold, the representative controlling strip, and the electric connections, for all of the said magnets, under the control of said strip, all arranged and operating substantially as and for the purposes set forth.

85. A machine organized for casting and setting type, comprising a constantly running shaft, cams, &c., for the application of power, the variable type-body mold, the two-way movable matrix block, the sets of stops and stop magnets, for positioning the mold plunger and the matrix block, the representative controlling strip, the electric connections for said magnets, under the control of said strip, and a melting pot, for supplying metal to said mold, substantially as described.

86. A machine organized for casting and setting type into justified lines, comprising a constantly running shaft, cams, &c., for the application of power, the variable type-body mold, the two-way movable matrix-block, the justifier, the several sets of stops and stop-magnets for positioning the mold plunger, matrix-block, and the parts of said justifier, the escapement magnet, for rendering the justifier active at word spaces, the two-way switch and its trip magnet, the representative controlling strip, the electric connections for all of said magnets, under the control of said strip, arranged into the working, setting and trip circuits, as described, and a melting pot, for supplying metal to said mold, substantially as described.

87. In the type-casting and setting machine, substantially as described, the combination with the representative controlling strip and the several sets of circuit connections controlled thereby, distinguished as the working circuit, setting circuit, &c., of the spring and the constantly running rotary cam, for operating the pump plunger, a pump-latch or lock normally in position, to render the pump plunger inactive, and an electric trip for said latch, located in said working circuit only, substantially as described, whereby the pump cannot act except when a cast is required.

88. In the type casting and setting machine, substantially as described, the combination with the representative controlling strip, and the several sets of circuit connections controlled thereby, distinguished as the working circuit, setting circuit, &c., of the spring $c^{23}$ and the cam-surface $c^{25}$ on the constantly running cam-wheel No. 1, for operating the pump plunger, a latch or lock, normally in position to render the pump-plunger inactive, and an electric trip for said pump latch or lock, located in said working circuit only, with the said cam arranged to sustain the entire strain from said pump spring, when the trip of said lock or latch takes place, whereby the pump cannot act except when a cast is required and the electric trip can be made sensitive and quick; substantially as described.

In testimony whereof I affix my signature in presence of two witnesses.

GEORGE A. GOODSON.

Witnesses:
JAS. F. WILLIAMSON,
E. F. ELMORE.